US008600555B2

(12) United States Patent
Nihei et al.

(10) Patent No.: US 8,600,555 B2
(45) Date of Patent: *Dec. 3, 2013

(54) DEVICE, PROGRAM, RECORDING MEDIUM AND METHOD FOR CORRECTING TAUGHT POINT

(75) Inventors: Ryo Nihei, Fujiyoshida (JP); Tetsuaki Kato, Hadano (JP); Hiroji Nishi, Yamanashi (JP)

(73) Assignee: FANUC Ltd, Minamitsuru-gun, Yamanashi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/984,796

(22) Filed: Jan. 5, 2011

(65) Prior Publication Data

US 2011/0106304 A1   May 5, 2011

Related U.S. Application Data

(63) Continuation of application No. 11/441,020, filed on May 26, 2006, now Pat. No. 7,979,161.

(30) Foreign Application Priority Data

May 27, 2005  (JP) .................................. 2005-155680

(51) Int. Cl.
*G06F 19/00*   (2011.01)
*G05B 19/19*   (2006.01)

(52) U.S. Cl.
USPC ............ 700/264; 700/245; 700/193; 700/186

(58) Field of Classification Search
USPC ......... 700/245, 250, 193, 187, 255, 186, 183, 700/173, 114, 117, 159, 264; 717/110, 111, 717/168
See application file for complete search history.

(56) References Cited

U.S. PATENT DOCUMENTS 4,817,017 A   3/1989   Kato
5,053,976 A   10/1991  Nose et al.
(Continued)

FOREIGN PATENT DOCUMENTS

EP   0 062 244       10/1982
EP   1 471 402 A2   10/2004
(Continued)

OTHER PUBLICATIONS

Japanese Notice of Reasons for Rejection mailed Jul. 3, 2007 (including a partial translation thereof).
Chinese First Office Action issued Feb. 15, 2008 issued in CN Application No. 2006100827838 (including a partial translation thereof).
European Search Report issued Mar. 31, 2009 issued in EP Application No. 06010775.2.

*Primary Examiner* — Christine Behncke
(74) *Attorney, Agent, or Firm* — Drinker Biddle & Reath LLP

(57) ABSTRACT

A taught point correcting device for correcting a taught point in an operation program of a robot. The device includes a judging section judging whether position data of any of a plurality of different taught points, previously taught and included in an operation program, has been corrected or not; and a data correcting section correcting, when the judging section judges that position data of a first taught point among the different taught points has been corrected, position data of a correlative taught point having a relative positional relationship with the first taught point, in accordance with a taught-point rule previously prescribing the relative positional relationship between the different taught points. The device may also include a storing section storing the taught-point rule. The taught-point rule may include a rule prescribing a distance between any two taught points among the different taught points.

8 Claims, 14 Drawing Sheets

(56) References Cited

U.S. PATENT DOCUMENTS

| | | | |
|---|---|---|---|
| 5,276,777 A | 1/1994 | Hara | |
| 5,341,458 A | 8/1994 | Kaneko et al. | |
| 5,467,003 A | 11/1995 | Kosaka et al. | |
| 5,608,618 A | 3/1997 | Kosaka et al. | |
| 6,021,361 A * | 2/2000 | Taninaga et al. | 700/182 |
| 6,192,298 B1 | 2/2001 | Nishikawa | |
| 6,522,949 B1 * | 2/2003 | Ikeda et al. | 700/245 |
| 7,209,801 B2 * | 4/2007 | Anfindsen et al. | 700/245 |
| 2004/0186627 A1 * | 9/2004 | Watanabe et al. | 700/264 |
| 2005/0065990 A1 | 3/2005 | Allen | |
| 2006/0152533 A1 * | 7/2006 | Read | 345/653 |

FOREIGN PATENT DOCUMENTS

| | | |
|---|---|---|
| JP | 55-140903 | 10/1980 |
| JP | 03-066586 | 3/1991 |
| JP | 7-200043 | 8/1995 |
| JP | 2004-280529 | 10/2004 |
| JP | 2005-066797 | 3/2005 |

* cited by examiner

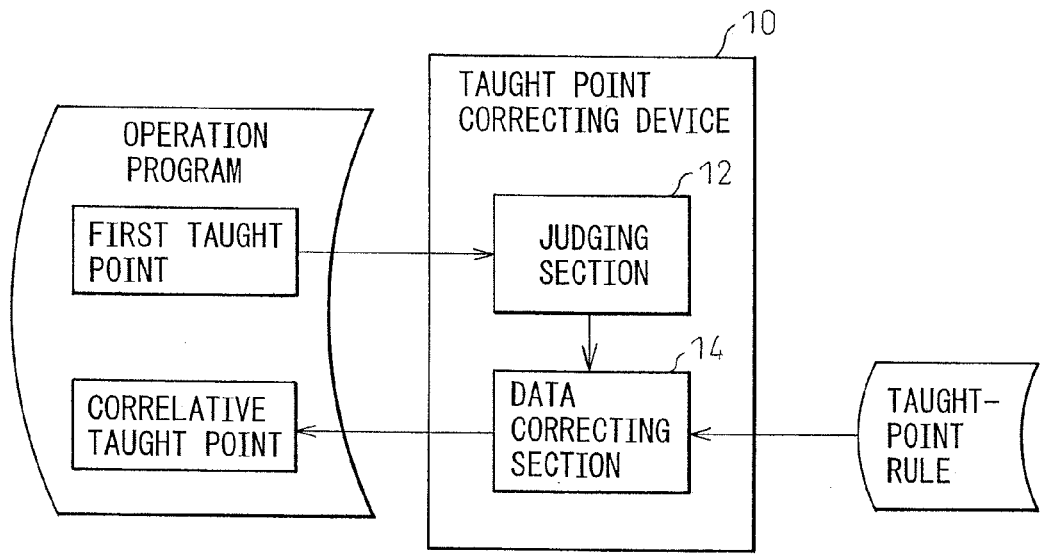
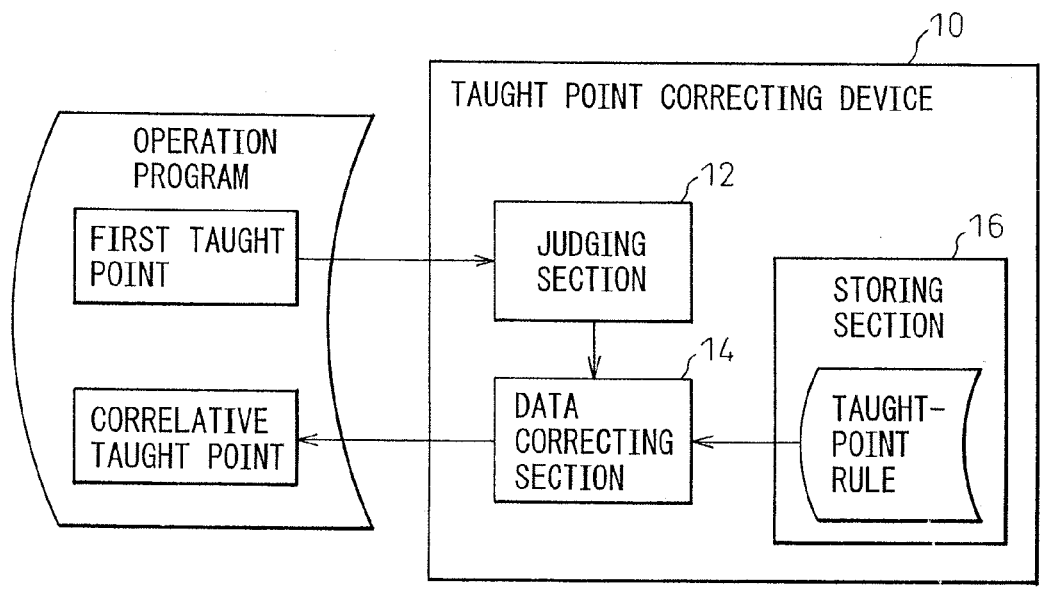

DEVICE, PROGRAM, RECORDING MEDIUM AND METHOD FOR CORRECTING TAUGHT POINT

This is a continuation application of copending prior application Ser. No. 11/441,020, filed on May 26, 2006, now U.S. Pat. No. 7,979,161 which is incorporated by reference herein in its entirety.

BACKGROUND OF THE INVENTION

1. Field of the Invention

The present invention relates to a device for correcting a taught point in an operation program of a robot. The present invention also relates to a program and a recording medium, for correcting a taught point in an operation program of a robot. The present invention further relates to a method for correcting a taught point in an operation program of a robot.

2. Description of the Related Art

An industrial robot (hereinafter referred to simply as a robot) operates so as to follow a certain operation program (or a task program). When a plurality of operation programs are prepared, which correspond to the types of tools (or end effecters) attached to the robot, the types of objective workpieces, the contents of operations, etc., and are given to a robot, the robot can execute various kinds of tasks. For example, in a spot welding robot, when a vehicle body to be welded is newly and additionally provided, a new welding-operation program including data of weld points on the vehicle body is prepared. In this case, if an existing welding gun attached to the robot tends to interfere with surrounding objects (such as a jig or a vehicle body part) during the welding of the newly provided vehicle body, the existing gun is replaced with another welding gun having such a shape as to avoid interference, and a new welding-operation program suitable for the other welding gun is prepared.

In order to prepare an operation program to control the operation of a robot, an operator makes the respective control axes of the robot run in a manual mode at low speed, generally by using an operating panel or "a teach pendant", so as to sequentially position a tool at a plurality of working points at which a task is performed on a workpiece, and thereby makes the robot store the working points as "taught points". The robot stores the actual positions of the respective control axes at an instant the tool is positioned at each of the working points, as the information of position and orientation of the robot at each of the taught points (referred to as "position data of a taught point" in the present application). In this connection, it is also known to perform the above programming by teaching, through an offline simulation using a personal computer or the like.

When a new operation program is required to be prepared, e.g., the addition of a new workpiece, it is possible to meet such requirement by correcting the position data of desired taught point(s) among the previously stored taught points, except for a new working point that should be newly stored in the robot as an additional taught point. Conventionally, in order to correct the taught point(s), a measure has been performed wherein the position data of taught points, relating to all of the working points required to be modified, are corrected one by one. For example, Japanese Unexamined Patent Publication (Kokai) No. 2004-280529 (JP-A-2004-280529) discloses a taught-point correcting device for correcting, one by one, the position data of a plurality of taught points included in an operation program of a robot.

In a case where an item to be produced is added in a highly automated manufacturing system using a robot, a production line is required to be modified. In this connection, a large number of actions are required to redesign various kinds of hardware, such as a jig, a machine, a conveyor, etc., and to prepare various kinds of software, such as a processing program of a processing machine, an operation program of a robot, a sequence ladder and a production management program of a programmable controller (PC) or a production management device, etc. Effectively reducing the number of actions required to construct the hardware/software, so as to deal with a modification of the production line, has been recognized as a significant problem relating to costs in the automated manufacturing system, and therefore it is desirable to decrease the number of steps for preparing an operation program of a robot.

In some cases, after starting the operation of a manufacturing system, it is required to adjust a taught point included in the operation program of a robot. Such adjustment may involve correction of a bolt position at which a bolt is fastened by a nut runner, fine adjustment of a holding position at which a workpiece is held by a hand, and so on. The adjustment of the taught point depends on the processing or dimensional accuracy of a workpiece, and therefore the necessity of adjustment generally cannot be clearly recognized before the manufacturing system starts to operate. In this connection, there is a case where the position data of several taught points included in an operation program have a certain correlation with each other, or the same taught point is included in several different operation programs. In such a case, it is essential for the operator to be skilled in a teach-programming, and further to systematically understand in detail the contents of all of operation programs given to the robot, so as to properly adjust the taught points. Also, in the above-described conventional measure correcting one by one the position data of taught points relating to all of the working points required to be modified, the workload of an operator may increase considerably, which may result in erroneous or undesirable corrections. Further, the stored information before correction is usually lost by correcting the data of taught points, and therefore in a case where an erroneous or undesirable correction has been performed, it is difficult to restore the position data of taught points to a state before correction.

SUMMARY OF THE INVENTION

It is an object of the present invention to provide a device for correcting a taught point in an operation program of a robot, the device being capable of quickly and properly correcting taught points by a reduced number of steps, without requiring an operator to be skilled or to understand the operation program at a high level.

It is another object of the present invention to provide a program used for correcting a taught point in an operation program of a robot, the program being capable of making a computer function in such a manner as to quickly and properly correct taught points by a reduced number of steps, without requiring an operator to be skilled or to understand the operation program at a high level.

It is a further object of the present invention to provide a recording medium used for correcting a taught point in an operation program of a robot, the recording medium being readable by a computer and recording the program capable of making a computer function in such a manner as to quickly and properly correct taught points by a reduced number of steps, without requiring an operator to be skilled or to understand the operation program at a high level.

It is a still further object of the present invention to provide a method for correcting a taught point in an operation program of a robot, the method being capable of quickly and properly correcting taught points by a reduced number of steps by using a computer, without requiring an operator to be skilled or to understand the operation program at a high level.

In order to accomplish the above objects, the present invention provides a taught point correcting device for correcting a taught point in an operation program of a robot, the device comprising a first judging section judging whether position data of any of a plurality of different taught points, previously taught and included in an operation program, has been corrected or not; and a data correcting section correcting, when the first judging section judges that position data of a first taught point among the different taught points has been corrected, position data of a correlative taught point having a relative positional relationship with the first taught point, in accordance with a taught-point rule previously prescribing the relative positional relationship between the different taught points.

In the above-described taught point correcting device, the modified configuration may be provided such that the operation program includes three or more different taught points; and the data correcting section corrects position data of all of correlative taught points directly and indirectly having the relative positional relationship with the first taught point.

Also, the modified configuration may be provided such that the first judging section judges whether position data of any of a plurality of different taught points, previously taught and included in a plurality of operation programs, has been corrected or not; and the data correcting section corrects position data of all of correlative taught points, each of which is the correlative taught point, in the plurality of operation programs, in accordance with the taught-point rule.

The taught point correcting device may further comprise a second judging section judging, when the first judging section judges that the position data of the first taught point has been corrected, whether a correction of the position data of the first taught point is valid or not, in accordance with the taught-point rule. In this arrangement, the data correcting section corrects the position data of the correlative taught point when the second judging section judges that the correction of the position data of the first taught point is valid.

The taught point correcting device may further comprise a third judging section judging, when the first judging section judges that the position data of the first taught point has been corrected, which one of a correction of the position data of the first taught point and a correction of the position data of the correlative taught point is more important, in accordance with the taught-point rule. In this arrangement, the data correcting section corrects the position data of the correlative taught point when the third judging section judges that the correction of the position data of the first taught point is more important than the correction of the position data of the correlative taught point.

The taught point correcting device may further comprise a storing section storing the taught-point rule.

The taught point correcting device may further comprise a storing section storing the taught point database.

The present invention also provides a taught point correcting program used for correcting a taught point in an operation program of a robot, the program making a computer function as (i) a judging section judging whether position data of any of a plurality of different taught points, previously taught and included in an operation program, has been corrected or not; and (ii) a data correcting section correcting, when the judging section judges that position data of a first taught point among the different taught points has been corrected, position data of a correlative taught point having a relative positional relation-ship with the first taught point, in accordance with a taught-point rule previously prescribing the relative positional relationship between the different taught points.

The present invention also provides a computer-readable recording medium used for correcting a taught point in an operation program of a robot, the recording medium recording a taught point correcting program for making a computer function as (i) a judging section judging whether position data of any of a plurality of different taught points, previously taught and included in an operation program, has been corrected or not; and (ii) a data correcting section correcting, when the judging section judges that position data of a first taught point among the different taught points has been corrected, position data of a correlative taught point having a relative positional relationship with the first taught point, in accordance with a taught-point rule previously prescribing the relative positional relationship between the different taught points.

The present invention also provides a taught point correcting method for correcting a taught point in an operation program of a robot by using a computer, the method comprising judging, by a judging section of a computer, whether position data of any of a plurality of different taught points, previously taught and included in an operation program, has been corrected or not; and correcting, by a data correcting section of a computer, when the judging section judges that position data of a first taught point among the different taught points has been corrected, position data of a correlative taught point having a relative positional relationship with the first taught point, in accordance with a taught-point rule previously prescribing the relative positional relationship between the different taught points.

BRIEF DESCRIPTION OF THE DRAWINGS

The above and other objects, features and advantages of the present invention will become more apparent from the following description of preferred embodiments in connection with the accompanying drawings, wherein:

FIGS. 1A and 1B are functional block diagrams, each showing a basic configuration of a taught point correcting device according to the present invention;

DETAILED DESCRIPTION

Figure 2A:
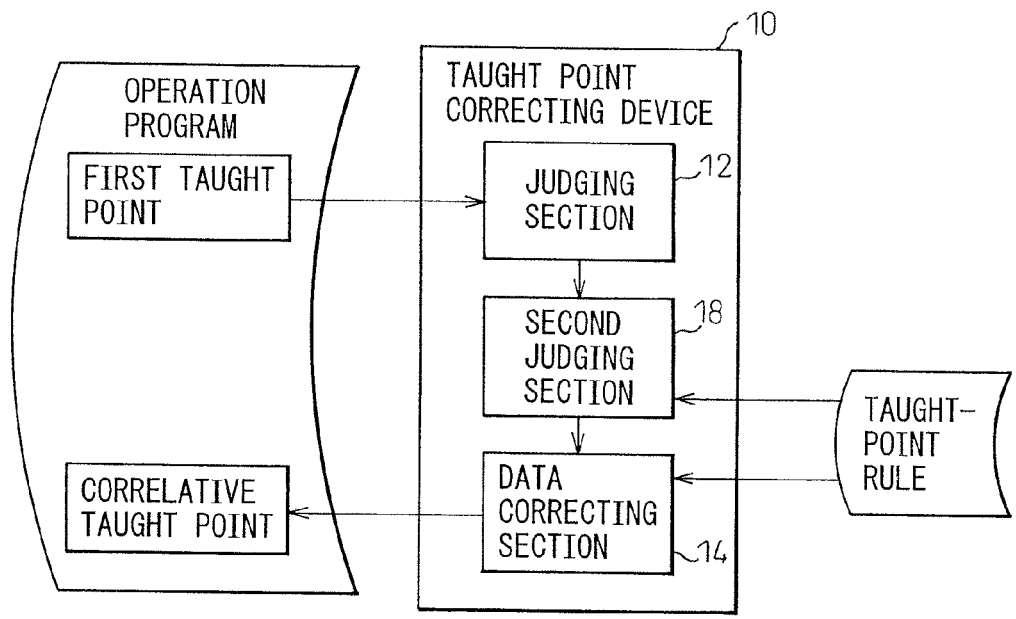
FIGS. 2A and 2B are functional block diagrams, each showing a first development of the taught point correcting device shown in each of FIGS. 1A and 1B.

The embodiments of the present invention are described below in detail, with reference to the accompanying drawings. In the drawings, the same or similar components are denoted by common reference numerals.

Referring to the drawings, FIGS. 1A and 1B are functional block diagrams, each showing a basic configuration of a taught point correcting device 10 according to the present invention. The taught point correcting device 10 has a configuration for correcting a taught point in an operation program of a robot, and including a judging section 12 judging whether position data of any of a plurality of different taught points, previously taught and included in an operation program, has been corrected or not; and a data correcting section 14 correcting, when the judging section 12 judges that position data of a first taught point among the different taught points has been corrected, position data of a correlative taught point having a predetermined relative positional relationship with the first taught point, in accordance with a taught-point rule previously prescribing the relative positional relationship between the different taught points (FIG. 1A). In this configuration, the taught point correcting device 10 may further include a storing section 16 storing the taught-point rule (FIG. 1B), and the taught-point rule may include a rule prescribing a distance between any two taught points among the different taught points.

According to the taught point correcting device 10 having the above basic configuration, when an operator simply corrects the position data of one or the first taught point included in the operation program, it is possible to automatically correct the position data of the correlative taught point, that must maintain the predetermined relative positional relationship with the first taught point, in accordance with the taught-point rule. Therefore, the efficiency of teach-programming improves, and the number of steps concerning the teach-programming can be effectively decreased. As a result, the start-up cost of a manufacturing system using a robot can be reduced, and the occurrence of trouble due to, e.g., an erroneous correction of position data can be prevented, thereby improving the operation rate of the manufacturing system. Consequently, it is possible to automate the manufacturing system at a high level by using a robot, which was conventionally difficult to automate from the viewpoint of cost and operation rate.

The above characteristic effects become more exceptional in a configuration wherein the operation program includes three or more different taught points, and the data correcting section 14 corrects the position data of all of correlative taught points having directly and indirectly the relative positional relationship with the first taught point; as well as a configuration wherein the judging section 12 judges whether the position data of any of a plurality of different taught points, previously taught and included in a plurality of operation programs, has been corrected or not, and the data correcting section 14 corrects the position data of all of correlative taught points in the operation programs, in accordance with the taught-point rule. According to these configurations, even if an operator is not familiar with the contents of all of the operation programs of the robot and/or even if an operator does not have a skilled teaching technique, it is possible to suitably and automatically correct the position data of all of the correlative taught points that must be corrected in company with the correction of the first taught point.

Figure 2B:
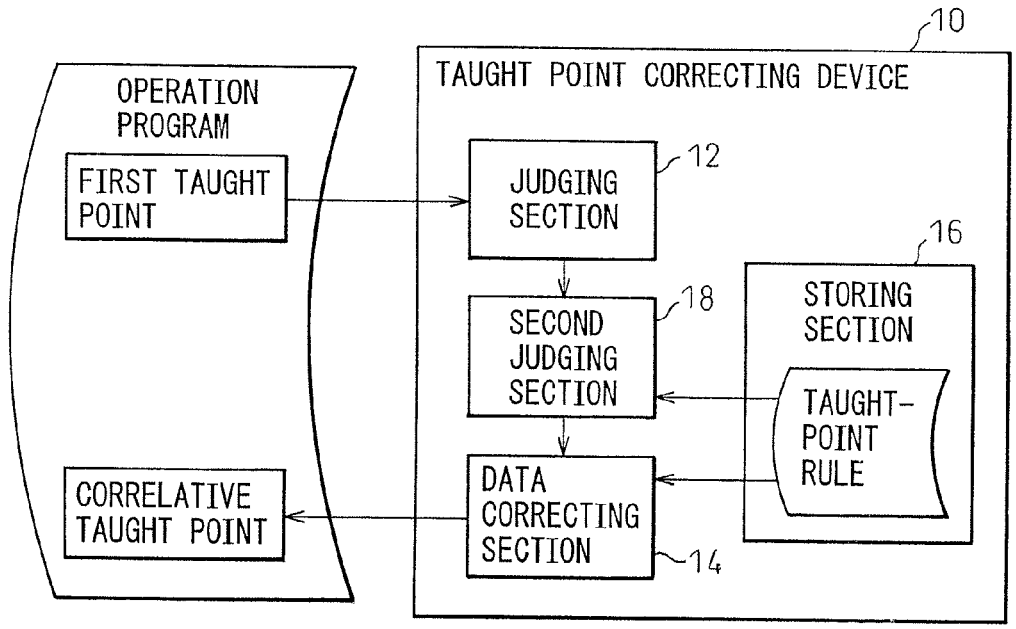

FIGS. 2A and 2B are functional block diagrams, each showing a first development of the taught point correcting device 10 of FIGS. 1A and 1B. The taught point correcting device 10, shown in each of FIGS. 2A and 2B, further includes a second judging section 18 judging, when the judging section 12 judges that the position data of the first taught point has been corrected, whether a correction of the position data of the first taught point is valid or not, in accordance with the taught-point rule (FIG. 2A). In this configuration, the data correcting section 14 corrects the position data of the correlative taught point, only when the second judging section 18 judges that the correction of the position data of the first taught point is valid. Also, in this configuration, the taught point correcting device 10 may further include the storing section 16 storing the taught-point rule (FIG. 2B), and the taught-point rule may include at least one of a rule prescribing an allowable range of the position data of any one taught point among the different taught points and a rule prescribing an allowable range of a distance between any two taught points among the different taught points.

According to the taught point correcting device 10 shown in each of FIGS. 2A and 2B, in a case where the correction of the position data of the first taught point is not valid, i.e., where the position of the corrected first taught point is an inappropriate position in the working space of the robot, it is possible to automatically and effectively prevent the position data of the correlative taught point from being corrected in company with the inappropriate correction of the first taught point, in accordance with the taught-point rule, even when the operator does not have a skilled teaching technique. As a result, it is possible to surely prevent the correlative taught point from being changed to an inappropriate position which may cause a delay in operation, and thus to improve safety in the manufacturing system.

Figure 3A:
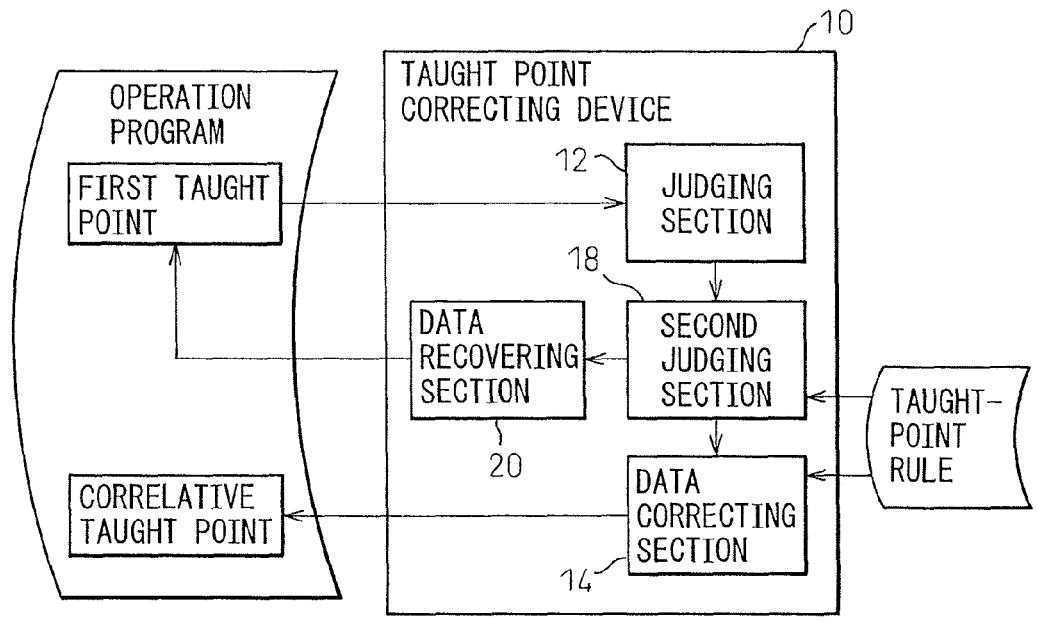
FIGS. 3A and 3B are functional block diagrams, each showing a second development of the taught point correcting device shown in each of FIGS. 1A and 1B.
Figure 3B:
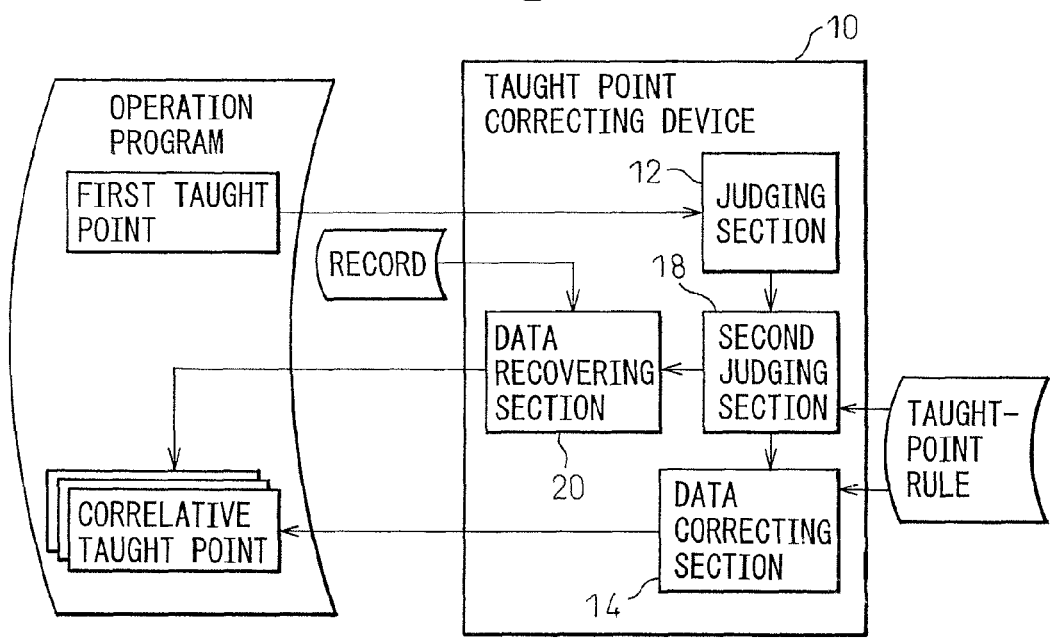

FIGS. 3A and 3B are functional block diagrams, each showing a second development of the taught point correcting device 10 of FIGS. 1A and 1B. The taught point correcting device 10, shown in each of FIGS. 3A and 3B, further includes a data recovering section 20 canceling the correction of the position data of the first taught point and recovering position data before the correction, when the second judging section 18 judges that the correction of the position data of the first taught point is not valid (FIG. 3A). Alternatively, or in addition to the above, the second judging section 18 may be configured to judge whether the correction of the position data of all of correlative taught points corrected by the data correcting section 14 is valid or not, and the data recovering section 20 may be configured, when the second judging section 18 judges that the correction of the position data of any of the correlative taught points is not valid, to cancel the correction of the position data of the judged correlative taught point and recover position data before the correction (FIG. 3B). In the configuration of FIG. 3B, the data recovering section 20 may refer to a record representing a correction time of the position data of all of the correlative taught points corrected by the data correcting section 14, and recover position data at a designated time in the record.

According to the taught point correcting device 10 shown in each of FIGS. 3A and 3B, in a case where the correction of the position data of the first taught point is not valid, it is possible to cancel the invalid correction of the position data of the first taught point and automatically recover the position data of the first taught point before the correction. Further, according to the configuration judging the validity of correction of all correlative taught points, in a case where it is recognized, after finishing a task performed in accordance with an operation program, that the corrected position of any of the correlative taught points is inappropriate, it is possible to automatically return the inappropriate position data of any of the correlative taught points to the position data before the correction. In this connection, according to the configuration referring to the correction record, it is possible to return the inappropriate position data of a plurality of correlative taught to the position data before the correction, simultaneously, or individually as occasion demands.

Figure 4A:
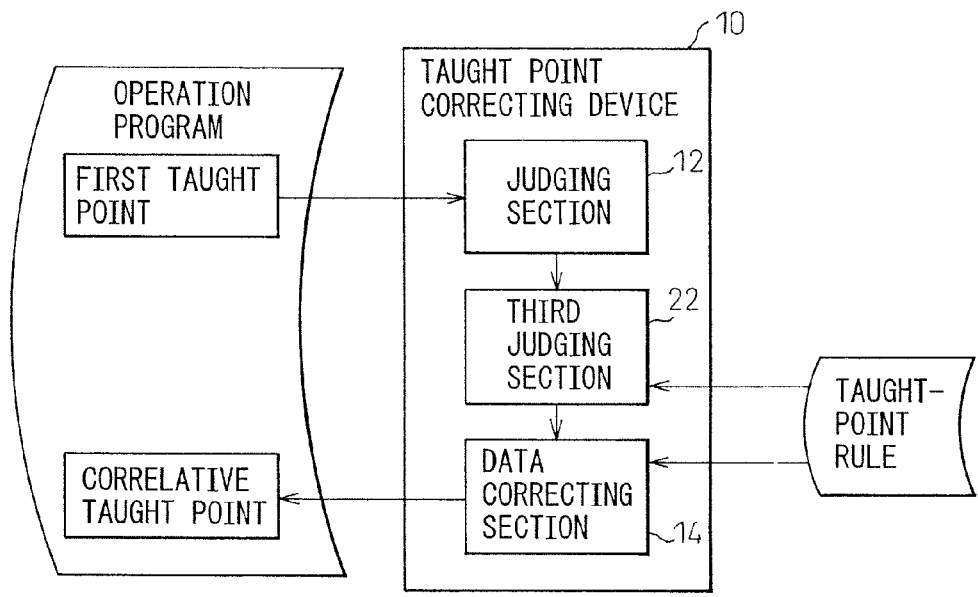
FIGS. 4A and 4B are functional block diagrams, each showing a third development of the taught point correcting device shown in each of FIGS. 1A and 1B.
Figure 4B:
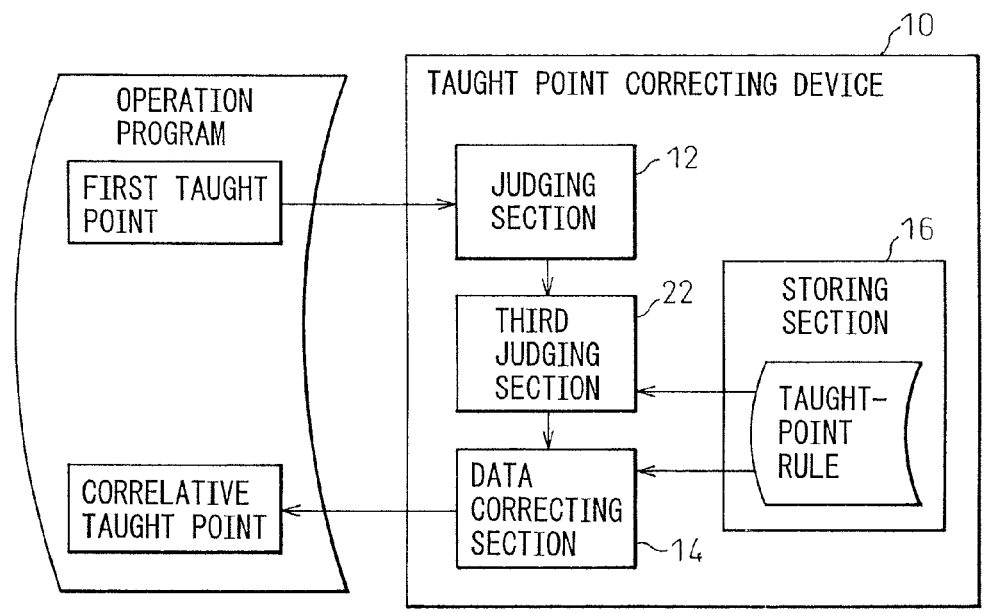

FIGS. 4A and 4B are functional block diagrams, each showing a third development of the taught point correcting device 10 of FIGS. 1A and 1B. The taught point correcting device 10, shown in each of FIGS. 4A and 4B, further includes a third judging section 22 judging, when the judging section 12 judges that the position data of the first taught point has been corrected, which one of a correction of the position data of the first taught point and a correction of the position data of the correlative taught point is more important, in accordance with the taught-point rule (FIG. 4A). In this configuration, the data correcting section 14 corrects the position data of the correlative taught point, only when the third judging section 22 judges that the correction of the position data of the first taught point is more important than the correction of the position data of the correlative taught point. Also, in this configuration, the taught point correcting device 10 may further include the storing section 16 storing the taught-point rule (FIG. 4B), and the taught-point rule may include a rule prescribing a relative importance between at least two taught points among the different taught points.

According to the taught point correcting device 10 shown in each of FIGS. 4A and 4B, it is possible to permit the position data of a taught point with a lower importance to be automatically corrected in company with the correction of the position data of a taught point with a higher importance, but to automatically prevent, in accordance with the taught-point rule, the position data of a taught point with a higher importance from being automatically corrected in company with the correction of the position data of a taught point with a lower importance. For example, a taught point concerning a holding position or a processing position, at which a tool directly operates on a workpiece, has a direct influence on operation quality, and therefore the correction thereof may be considered to have a higher importance. On the other hand, a taught point relating to a non-processing motion (a so-called air-cut motion) does not have a direct influence on operation quality, and therefore the correction thereof may be considered to have a lower importance. In this connection, according to the above configuration of the device 10, it is possible to previously prevent the taught point concerning the holding or processing position from being corrected at an instant the taught point relating to the air-cut motion is finely adjusted.

The configuration of a taught point correcting device, according to a preferred embodiment of the present invention, will be explained below with reference to FIGS. 5 to 14, in connection with an exemplary operation executed by a robot.

Figure 5:
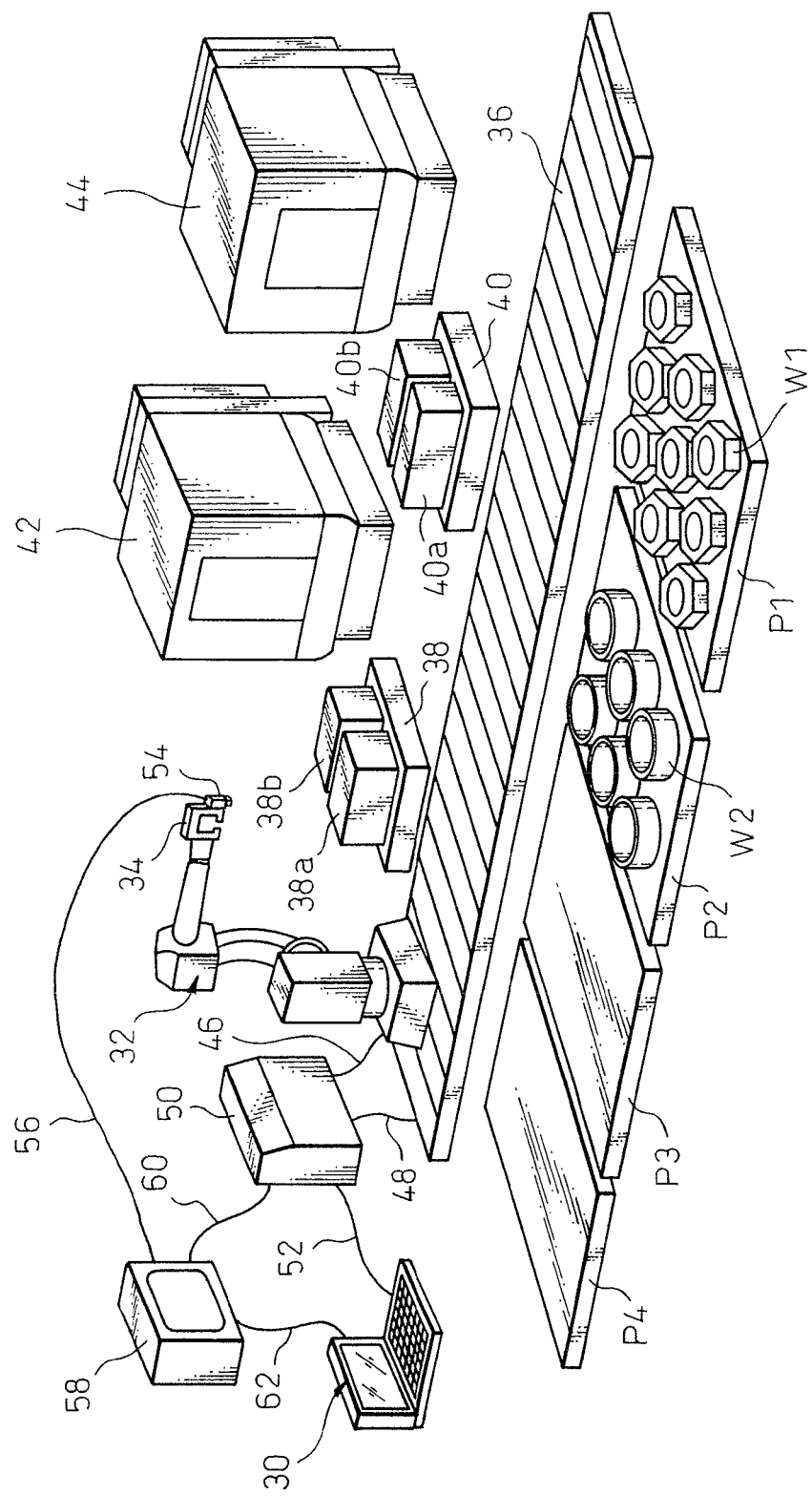
FIG. 5 is a schematic view showing entirely a manufacturing system using a robot, incorporating therein a taught point correcting device according to a first embodiment of the present invention.

FIG. 5 is a schematic view showing an entire manufacturing system using a robot, incorporating therein a taught point correcting device (i.e., an operation program preparing device) 30 according to one embodiment of the present invention. A tool (a hand, in the illustrated embodiment) 34 is attached to the end of a wrist of a robot (i.e., a robot mechanical section) 32. A plurality of workpieces W1 are placed on a pallet P1, and a plurality of workpieces W2, the type of which is different from the type of workpieces W1, are placed on a pallet P2. The robot 32 is installed on a conveyor (or a traveling axis) 36 to move along the conveyor 36, and operates to hold the workpiece W1 on the pallet P1 or the workpiece W2 on the pallet P2 by the tool 34, to carry the workpiece to a provisional table 38 or a provisional table 40, and to temporarily place the workpiece on the provisional table. The provisional table 38 is used when the workpiece is fed to a processing machine 42, and the provisional table 40 is used when the workpiece is fed to a processing machine 44.

If the processing machine 42 is not operating, the robot 32 holds the workpiece W1 or workpiece W2 placed on the provisional table 38 by the tool 34 and feeds it to the processing machine 42. The processing machine 42 starts processing the workpiece, based on a process start command sent from the robot 32. At an instant the process is completed, the processing machine 42 transmits a process completion signal to the robot 32. The robot 32 receiving the process completion signal operates to take out the processed workpiece W1 or W2 from the processing machine 42, and to place the workpiece W1 on a pallet P3 but the workpiece W2 on a pallet P4. In a case where the workpiece is fed to the processing machine 44, an operation substantially corresponding to the above-described operation is performed, except that the provisional table 40 is used.

The robot 32 and the conveyor 36 are connected to a control device 50 through communication cables 46 and 48, respectively, and the control device 50 controls the operations of the robot 32 and the conveyor 36. The control device 50 is connected to an operation program preparing device (or a taught point correcting device) 30 through a network cable 52. A camera 54 is attached to the wrist end of the robot 32 adjacently to the tool 34. The camera 54 is connected to an image processing device 58 through a camera cable 56. The image processing device 58 is connected to the control device 50 and the operation program preparing device 30 through network cables 60 and 62, respectively. Positioning jigs 38a, 40a for the workpiece W1 carried from the pallet P1 and positioning jigs 38b, 40b for the workpiece W2 carried from the pallet P2 are installed on the provisional tables 38, 40, respectively. The positioning jigs 38a, 38b, 40a, 40b are respectively connected to the control device 50 through digital signal input/output cables (not shown).

Figure 6:
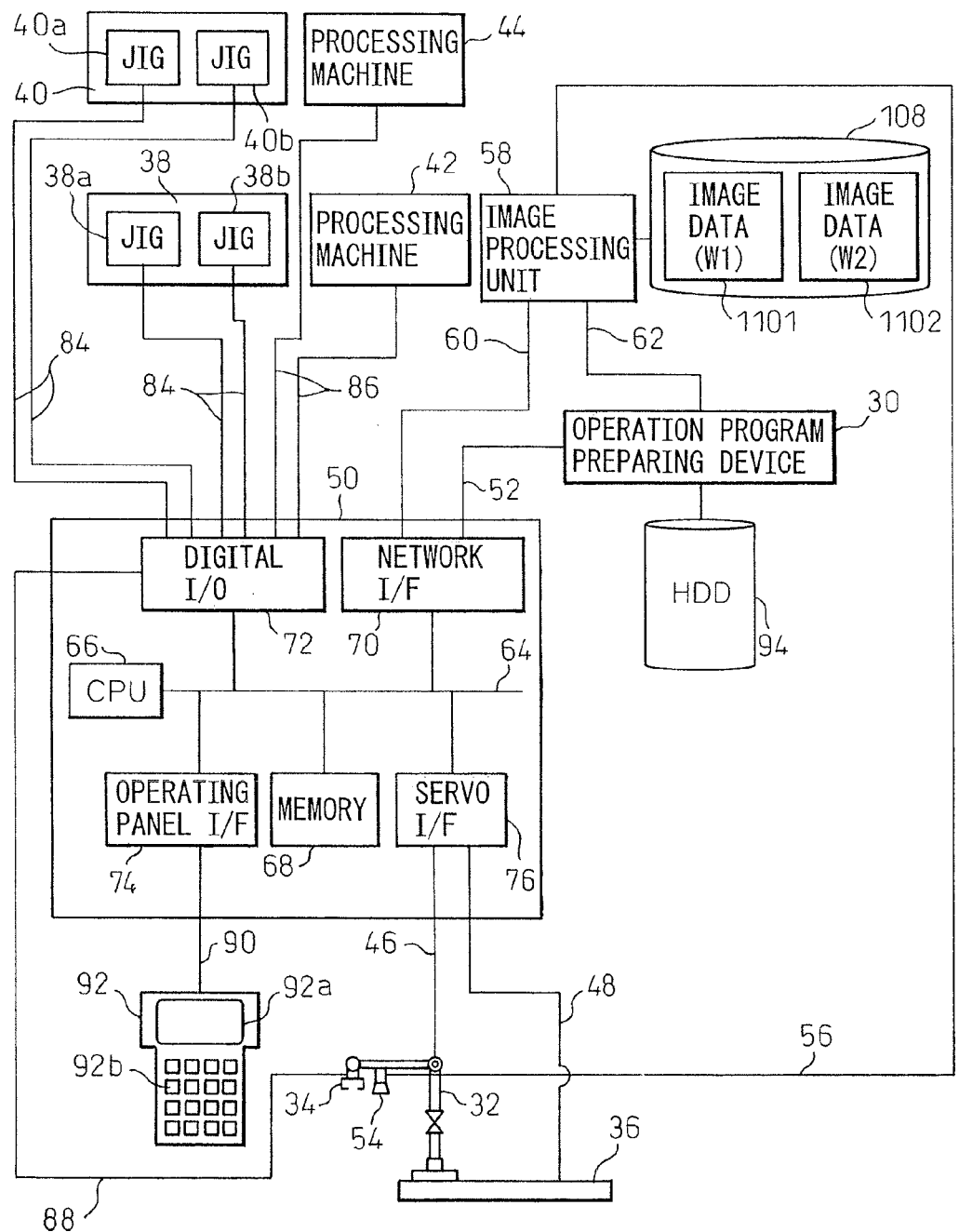
FIG. 6 is a block diagram showing a configuration of a control system in the manufacturing system of FIG. 5.
Figure 7:
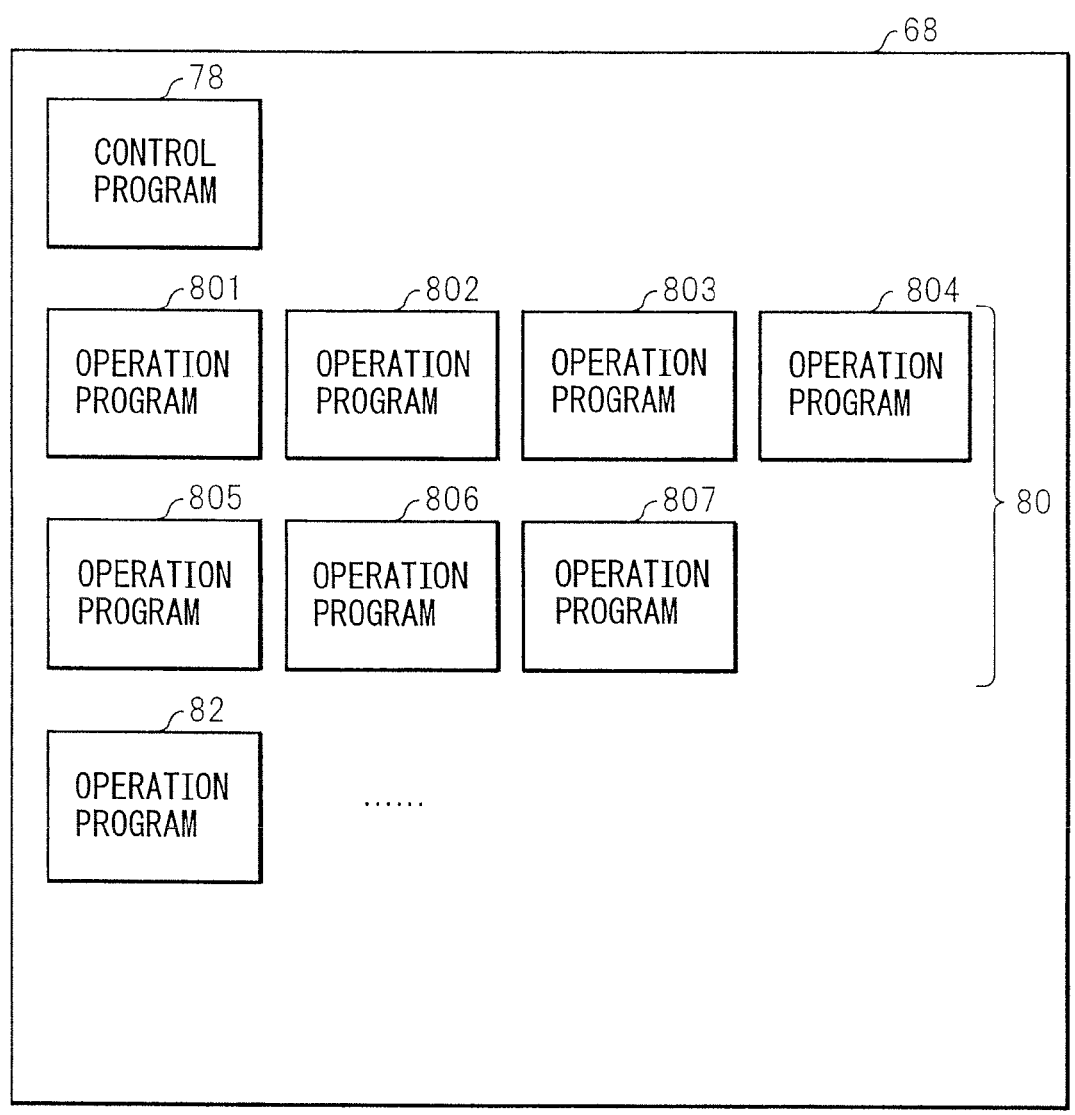
FIG. 7 is an illustration showing a memory of a control device in the control system of FIG. 6.

FIG. 6 is a block diagram showing mainly a configuration of a control system in the manufacturing system of FIG. 5. The control device 50 includes a central processing unit (CPU) 66, a memory 68, a network interface 70, a digital signal input/output circuit 72, an operating panel interface 74 and a servo interface 76, which are connected to each other through a bus 64. As shown in FIG. 7, the memory 68 stores a control program 78 adapted to be executed by the CPU 66 and to control the control device 50 in its entirety, and operation programs 80 and 82 adapted to make the robot 32 operate. The operation program 80 (801 to 807) is prepared to make the robot 32 execute a task concerning the workpiece W1 by using the tool 34, and the operation program 82 is prepared to make the robot 32 execute a task concerning the workpiece W2 by using the tool 34. Each of the operation programs 80, 82 is interpreted by using the control program 78, and is translated into the operations of the robot 32 and the tool 34. The operation programs 80, 82 are prepared by the operation program preparing device 30.

The network interface 70 is connected with the operation program preparing device 30 through the network cable 52, and also with the image processing device 58 through the network cable 60. The digital signal input/output circuit 72 is connected with the jigs 38a, 38b of the provisional table 38 and the jigs 40a, 40b of the provisional table 40 individually through a digital signal input/output cable 84; with the processing machines 42, 44 individually through a digital signal input/output cable 86; and with the tool 34 attached to the robot 32 through a digital signal input/output cable 88.

An operating panel or teach pendant 92 is connected to the operating panel interface 74 through an operating panel cable 90. The operating panel 92 includes a display 92a and an input button 92b. When an operator operates the operating panel 92, the robot 32 can be operated in a manual mode through the control device 50. Servo mechanisms, such as a servo motor of each of the control axes of the robot 32 and the conveyor 36, are connected to the servo interface 76 through the communication cables 46, 48.

Figure 8:
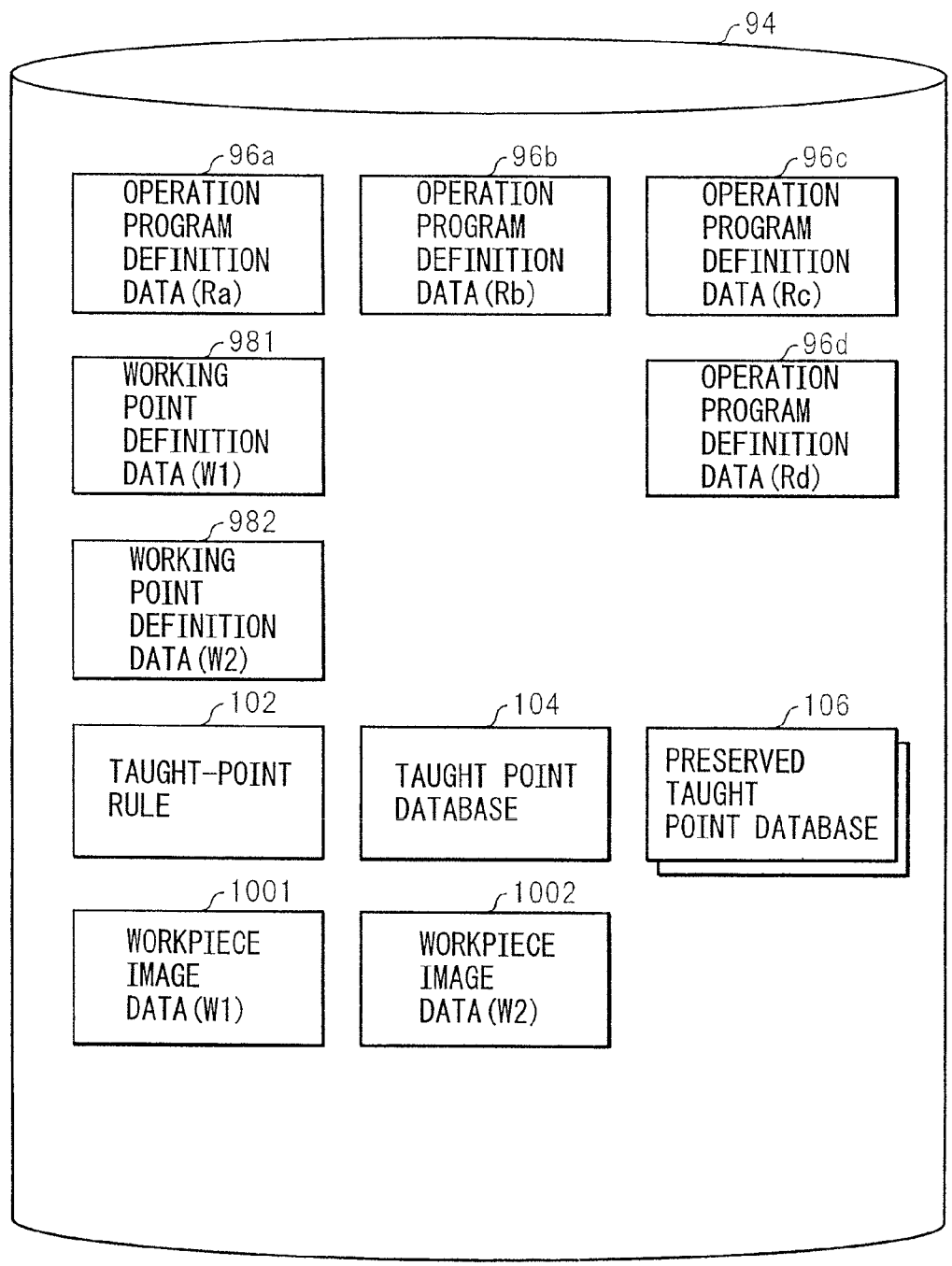
FIG. 8 is an illustration showing a hard disk device of the taught point correcting device in the control system of FIG. 6.
Figure 9:
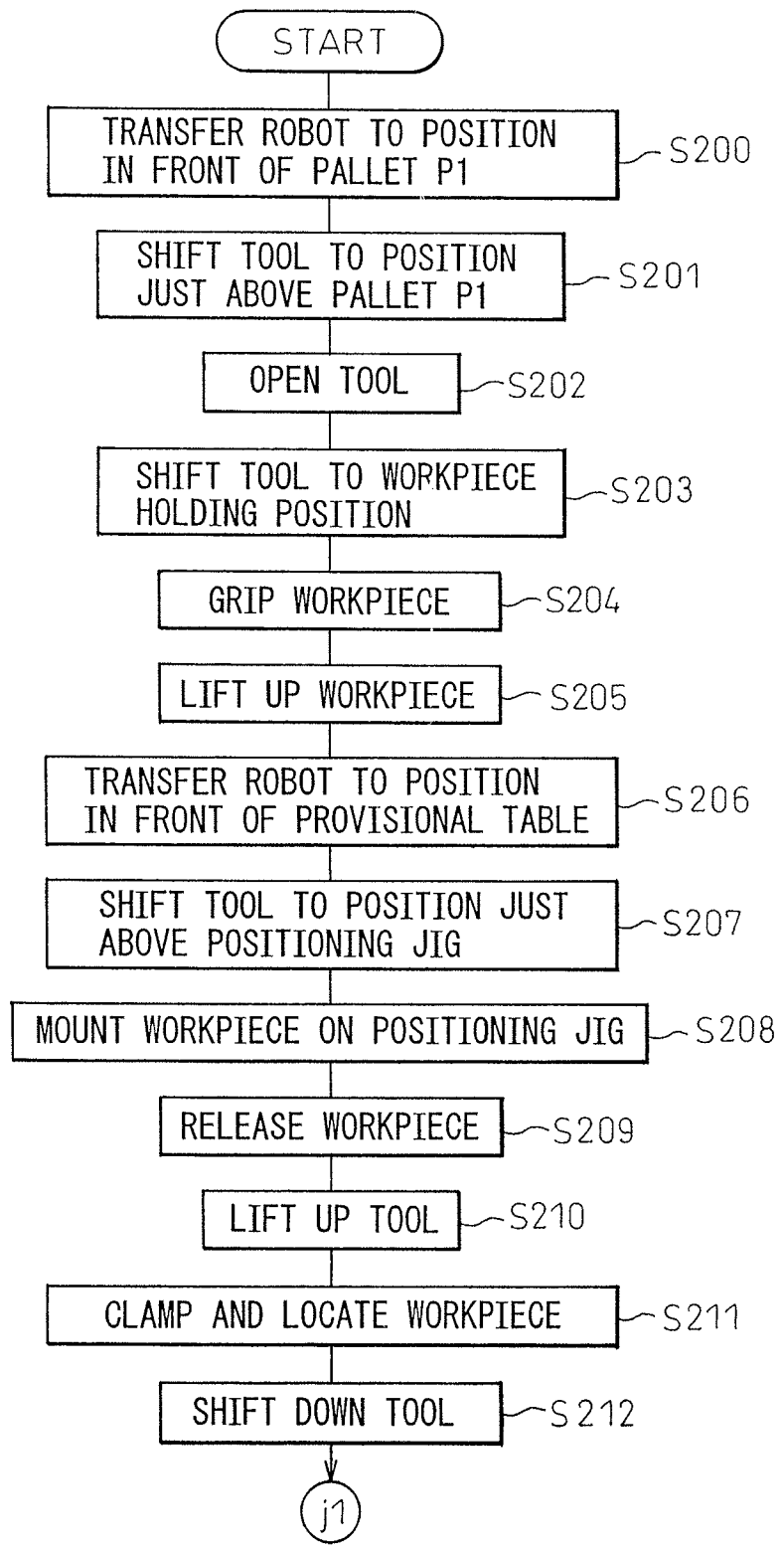
FIG. 9 is a flowchart showing a procedure of an operation executed by a robot in the manufacturing system of FIG. 5.
Figure 10:
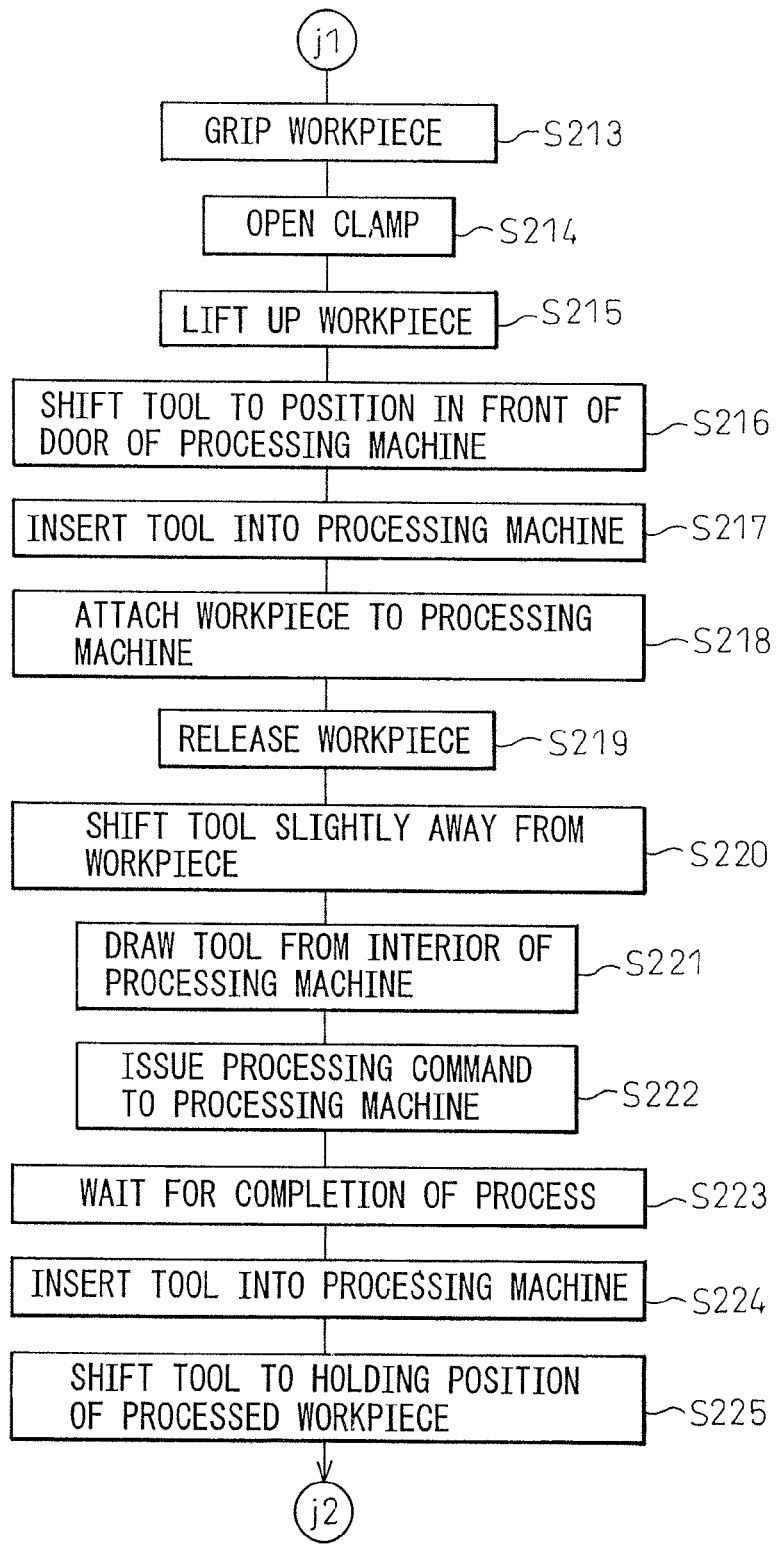
FIG. 10 is a flowchart showing a procedure of an operation executed by a robot in the manufacturing system of FIG. 5.
Figure 11:
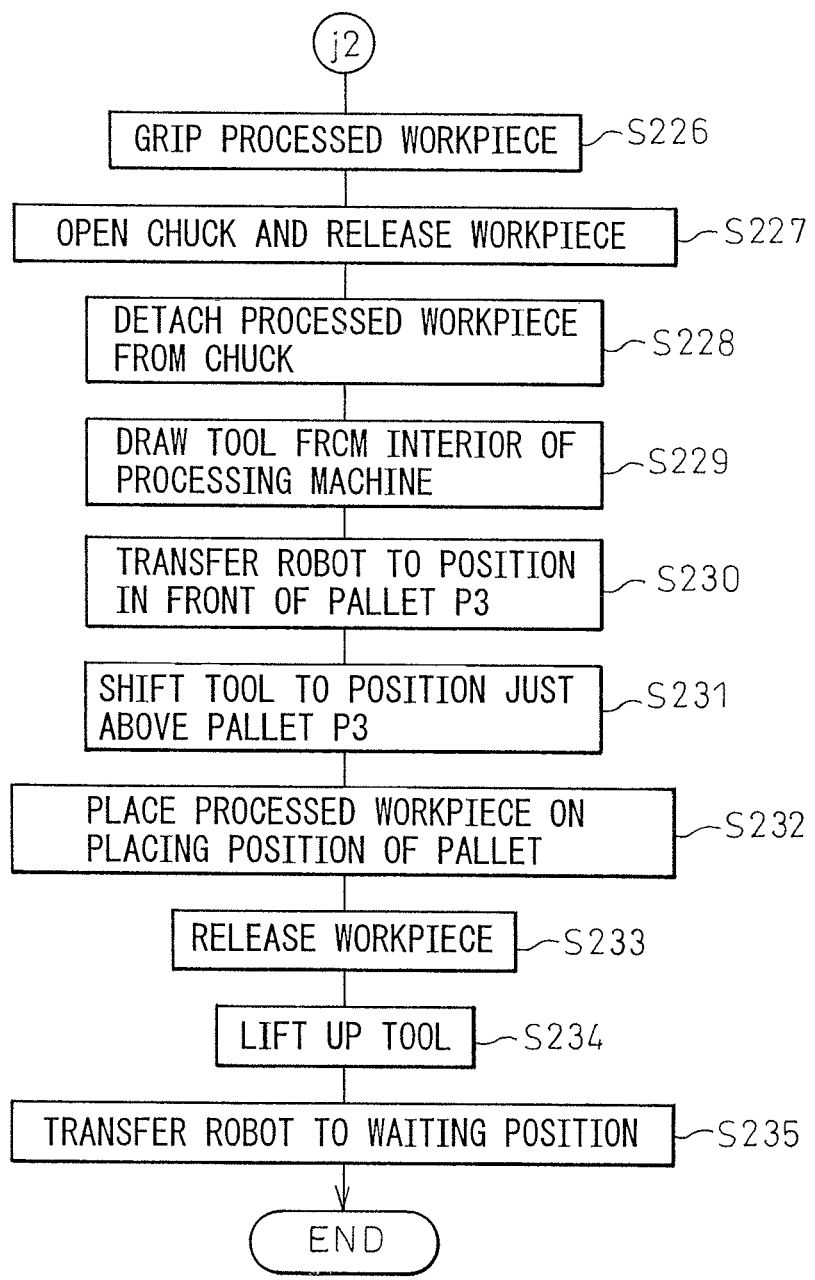
FIG. 11 is a flowchart showing a procedure of an operation executed by a robot in the manufacturing system of FIG. 5.

A hard disk device or drive 94 is connected to the operation program preparing device 30. Alternatively, the operation program preparing device 30 may incorporate therein the hard disk device 94. As shown in FIG. 8, the hard disk device 94 stores operation program definition data 96 (96a, 96b, 96c, 96d, in the illustrated embodiment) respectively concerning a plurality of working routes R (Ra, Rb, Rc, Rd, in the illustrated embodiment, as described later) along which the robot 32 works; working point definition data 98 (981, 982, in the illustrated embodiment) respectively concerning several types of workpieces W (W1, W2, in the illustrated embodiment) to be processed; and image data 100 (1001, 1002) of the workpieces W (W1, W2). Further, as described later, the hard disk device 94 stores a taught-point rule 102 previously prescribing a relative positional relationship between a plurality of different taught points included in the operation programs 80, 82; a taught point database 104 listing and describing each operation program 80, 82 and the position data of each taught point in a state as to be correlated with each other; and a preserved taught point database 106 including information before correcting the taught point.

The working route R of the robot 32, in the illustrated embodiment, includes the following: (1) a first working route Ra along which the robot operates to pick out the workpiece W1 from the pallet P1, to carry the workpiece W1 to the provisional table 38 and position it by the positioning jig 38a, to feed the workpiece W1 to the processing machine 42, to take out the processed workpiece W1 from the processing machine 42, and to place the workpiece W1 on the pallet P3; (2) a second working route Rb along which the robot operates to pick out the workpiece W2 from the pallet P2, to carry the workpiece W2 to the provisional table 38 and position it by the positioning jig 38b, to feed the workpiece W2 to the processing machine 42, to take out the processed workpiece W2 from the processing machine 42, and to place the workpiece W2 on the pallet P4; (3) a third working route Rc along which the robot operates to pick out the workpiece W1 from the pallet P1, to carry the workpiece W1 to the provisional table 40 and position it by the positioning jig 40a, to feed the workpiece W1 to the processing machine 44, to take out the processed workpiece W1 from the processing machine 44, and to place the workpiece W1 on the pallet P3; and (4) a fourth working route Rd along which the robot operates to pick out the workpiece W2 from the pallet P2, to carry the workpiece W2 to the provisional table 40 and position it by the positioning jig 40b, to feed the workpiece W2 to the processing machine 44, to take out the processed workpiece W2 from the processing machine 44, and to place the workpiece W2 on the pallet P4.

The operation program definition data 96a, 96b, 96c, 96d, respectively concerning the working routes Ra, Rb, Rc, Rd, are comprised of first data parts by which a robot motion is altered, depending on the types of workpieces W1, W2 to be operated by the robot 32, while second data parts by which a robot motion is not altered, depending on the types of workpieces W1, W2. The first data parts, depending on the workpiece, are prepared to have contents different for the respective workpieces W1, W2, based on the working point definition data 981, 982 respectively concerning the workpieces W1, W2 to be operated. As a result, the operation programs 80, 82 in connection respectively with the workpieces W1, W2 are completed.

Referring again to FIG. 6, a hard disk device or drive 108 is connected to the image processing device 58. Alternatively, the image processing device 58 may incorporate therein the hard disk device 108. The hard disk device 108 stores workpiece image data 110 (1101, 1102, in the illustrated embodiment) serving as references for the detection of the workpieces W to be operated (W1, W2, in the illustrated embodiment). The workpiece image data 1101, 1102 are obtained by photographing the images of the workpieces W1, W2 with the camera 54 attached to the wrist end of the robot 32.

FIGS. 9 to 14 show a procedure of an operation (or a handling operation) performed by the robot 32 under the control of the control device 50 in the above-described manufacturing system. In this connection, a handling operation for the workpiece W1 along the above-described first working route Ra concerning the provisional table 38 and the processing machine 42 is explained below, by way of example. It should be understood that an operation along the other working route can be performed in a similar way.

First, the conveyor 36 is activated, and the robot 32 is transferred to a position (a taught point) in front of the pallet P1 (step S200). Next, the arm of the robot 32 is operated to turn, so as to shift the tool 34 to a position (a taught point) just above the pallet P1 (step S201). Then, a digital signal indicating "open a hand" is output to the tool 34 through the digital signal input/output circuit 72, so as to open the tool 34 (step S202).

Next, the tool 34 is shifted toward a holding position (defined on the workpiece) at which the tool holds the workpiece W1. For this motion, the tool 34 is first shifted to a position (a taught point) just above the holding position (a taught point), and thereafter is shifted toward the holding position just below the former position at a low speed (step S203). This motion requires that the orientation of the robot 32 at the time of holding the workpiece be suitably determined, depending on the type of workpiece, and thus is arranged as a workpiece-type depending motion.

Then, a digital signal indicating "close a hand" is output to the tool 34 through the digital signal input/output circuit 72, and thereby the tool 34 is closed to hold or grip the workpiece W1 (step S204). Thereafter, the tool 34 is shifted upward to pick out the workpiece W1 from the pallet P1. For this motion, the tool 34 is first shifted at a low speed to a position (a taught point) just above the holding position (a taught point), and thereafter is shifted at an increased speed so as to further lift up the workpiece W1 (step S205).

Next, the arm of the robot 32 is operated to turn rightward and the conveyor 36 is simultaneously operated, and thereby the robot 32 is transferred to a position (a taught point) in front of the provisional table 38 (step S206). Next, the tool 34 is shifted to a position (a taught point) above the positioning jig 38a (step S207). Thereafter, the tool 34 is shifted toward a releasing position where the positioning jig 38a clamps the workpiece W1. For this motion, the tool 34 is first shifted to a position (a taught point) above the releasing position (a taught point), and thereafter is shifted toward the releasing position below the former position at a low speed, so as to mount the workpiece W1 on the positioning jig 38a (step S208). Then, a digital signal indicating "open a hand" is output to the tool 34 through the digital signal input/output circuit 72, so as to open the tool 34. As a result, the tool 34 releases the workpiece W1 (step S209).

Next, the tool 34 is shifted to a position (a taught point) above the releasing position (a taught point), and is left from the positioning jig 38a (step S210). Then, a digital signal indicating "close a clamp" is output to the positioning jig 38a through the digital signal input/output circuit 72, so as to close the positioning jig 38a. As a result, the workpiece W1 is accurately positioned at a predetermined position on the positioning jig 38a (step S211).

Next, the tool 34 is shifted toward a holding position (a taught point) on the workpiece W1 clamped by the positioning jig 38a (step S212). Next, the tool 34 is closed at the holding position, so as to hold or grip the workpiece W1 (step S213). Then, a digital signal indicating "open a clamp" is output to the positioning jig 38a, so as to open the positioning jig 38a (step S214). Thereafter, the tool 34 is shifted upward, so as to pick out the workpiece W1 from the positioning jig 38a. For this motion, the tool 34 is first shifted at a low speed to a diagonally upward position (a taught point) relative to the positioning jig 38a, and thereafter is shifted at an increased speed so as to further lift up the workpiece W1 (step S215).

Next, the arm of the robot 32 is operated to turn, so as to shift the tool 34 to a position (a taught point) in front of the processing machine 42 (step S216). Then, the tool 34 is inserted to an interior of the processing machine 42 through a door opening of the processing machine 42. For this motion, the arm of the robot 32 is operated to extend straightly for an insertion, so as to prevent the tool 34 and the workpiece W1 from contacting or colliding with the processing machine 42 (step S217). Thereafter, the tool 34 is temporarily stopped at a position (a taught point) just in front of a chuck (not shown) of the processing machine 42, and then the workpiece W1 is attached to the chuck (a taught point) at a low speed. Then, a digital signal indicating "close a chuck" is output to the processing machine 42 through the digital signal input/output circuit 72, so as to close the chuck (step S218).

Next, a digital signal indicating "open a hand" is output to the tool 34, so as to open the tool 34 and thus to release the workpiece W1 (step S219). Then, the tool 34 is shifted at a low speed to a position (a taught point) spaced at a slight distance from the chuck (step S220). Thereafter, the arm of the robot 32 is operated to extend straightly, so as to prevent the tool 34 from contacting with the processing machine 42, and to draw out the tool 34 through the door opening from the processing machine 42 (step S221).

Next, a digital signal indicating "start a process for a workpiece W1" is output, as a command from the first working route Ra, to the processing machine 42 through the digital signal input/output circuit 72 (step S222). The robot waits until a digital signal indicating "complete a process for a workpiece W1" is input from the processing machine 42 to the control device 50 (step S223). After the workpiece W1 has been completely processed, the tool 34 is inserted into the interior of the processing machine 42 (step S224), and is shifted toward a holding position (a taught point) on the processed workpiece W1 (step S225). Then, the tool 34 is closed, so as to hold or grip the workpiece W1 (step S226).

Next, a digital signal indicating "open a check" is output to the processing machine 42, so as to open the chuck (step S227). Then, the tool 34 is shifted slightly from the holding position, so as to pick out the workpiece W1 straightly from the chuck of the processing machine 42 (step S228). Thereafter, the tool 34 is retreated away from the processing machine 42 (step S229).

Next, the arm of the robot 32 is operated to turn rightward, and the conveyor 36 is activated to transfer the robot 32 to a position (a taught point) in front of the pallet P3 (step S230). The tool 34 is then shifted to a position (a taught point) just above the pallet P3 (step S231). Thereafter, the tool 34 is shifted to a placing position (a taught point) on the pallet P3, at which the workpiece W1 is placed, so as to place the workpiece W1 on the pallet P3. For this motion, the tool 34 is first shifted to a position (a taught point) just above the placing position, and thereafter is shifted at a low speed toward the placing position just below the former position, and thereby the workpiece W1 is placed on the pallet P3 (step S232). This workpiece placing motion requires that the orientation of the robot 32 at the time of placing the workpiece on the pallet P3 be suitably determined, depending on the type of workpiece, and thus is arranged as a workpiece-type depending motion.

Next, the tool 34 is opened, so as to release the workpiece W1 (step S233). Then, the tool 34 is shifted at a low speed to a position just above the placing position, and thereafter is shifted further upward at an increased speed (step S234). Last, the arm of the robot 32 is operated to turn toward the front of the robot, and the conveyor 36 is activated to transfer the robot 32 to an initial wait position (step S235). In this manner, the operation program 80 for the workpiece W1 in the first working route Ra is completed.

Figure 12:
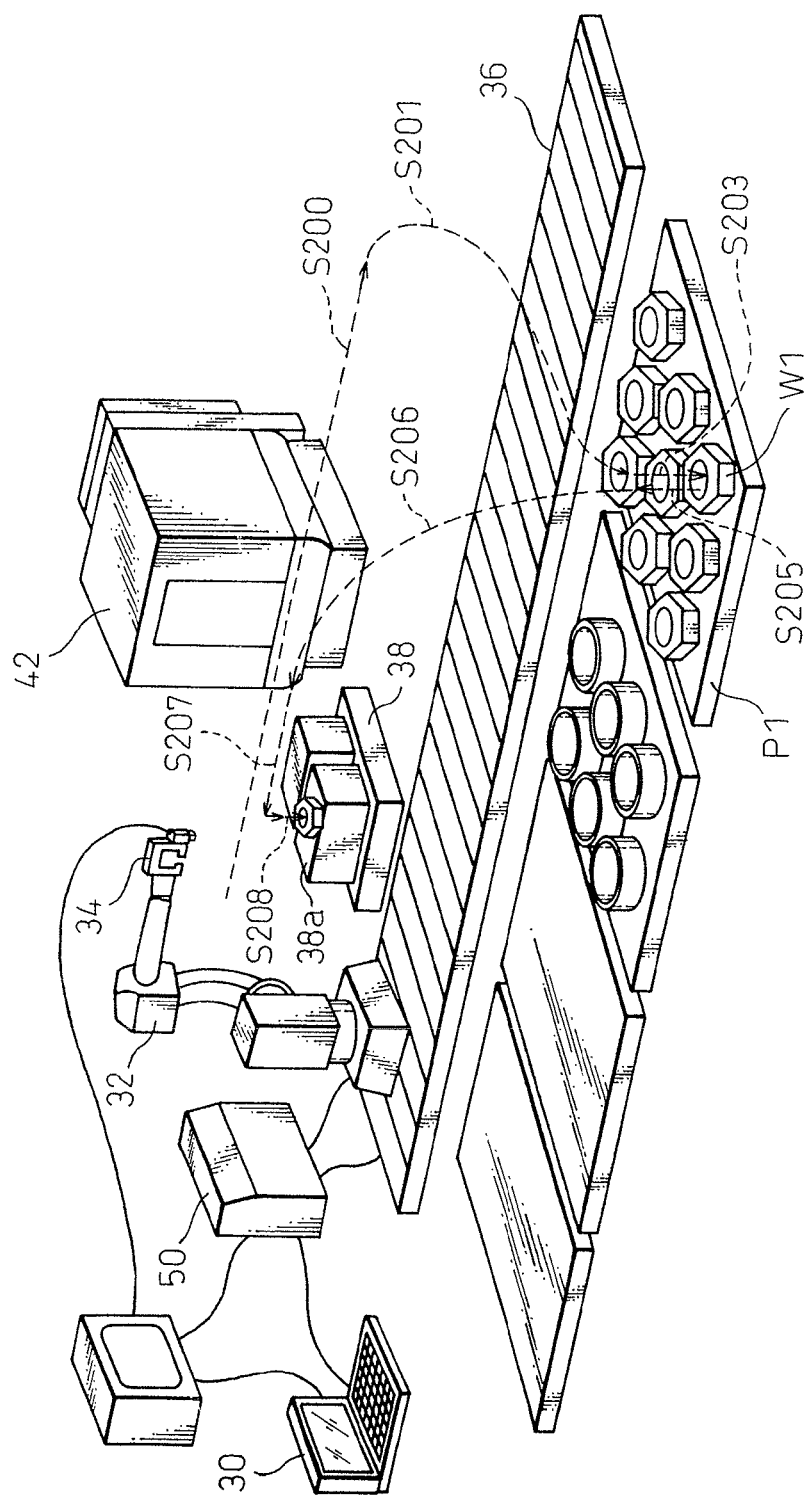
FIG. 12 is a schematic view showing, by a broken line with an arrow, a procedure of an operation executed by a robot in the manufacturing system of FIG. 5.
Figure 13:
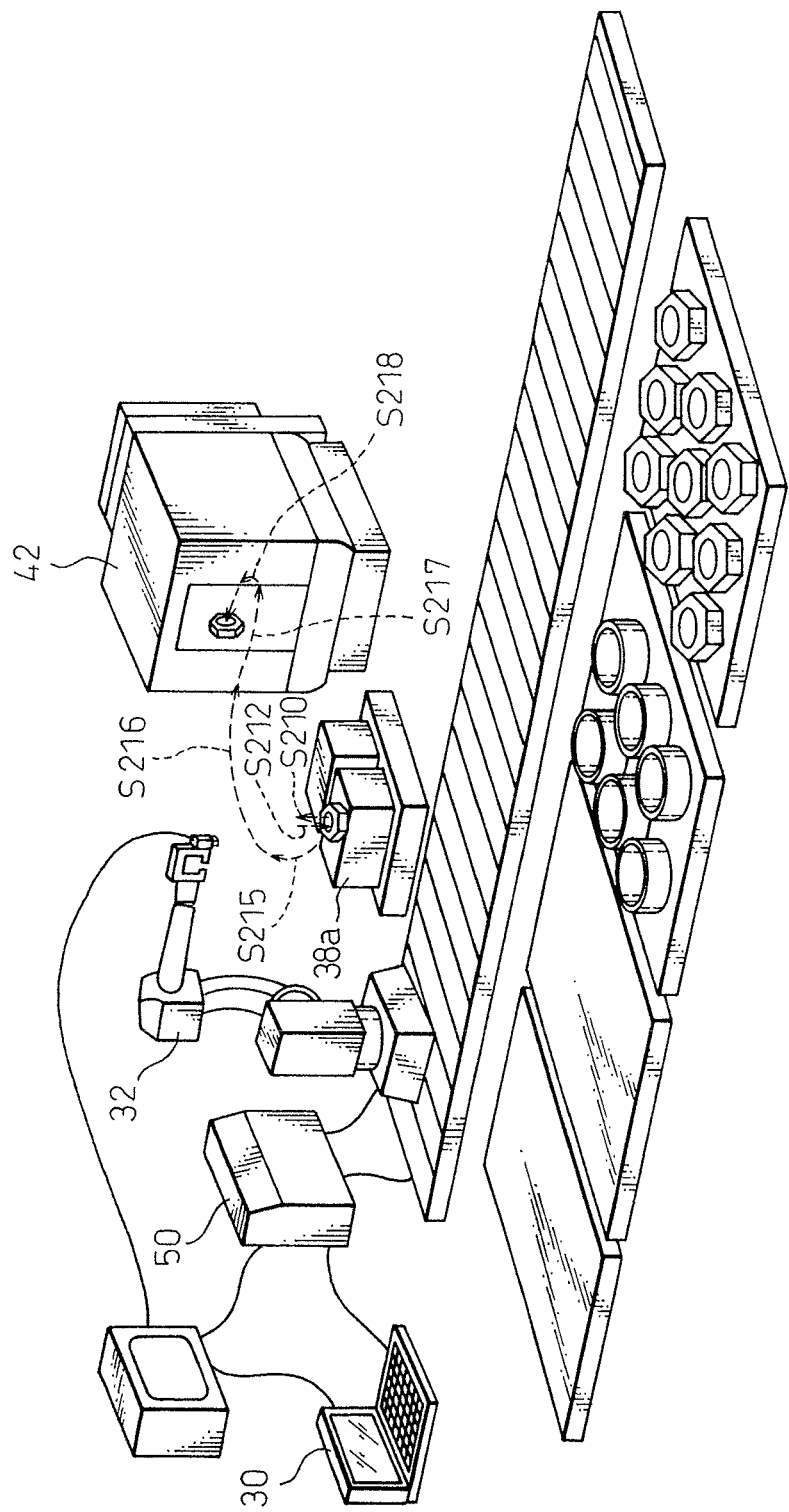
FIG. 13 is a schematic view showing, by a broken line with an arrow, a procedure of an operation executed by a robot in the manufacturing system of FIG. 5.
Figure 14:
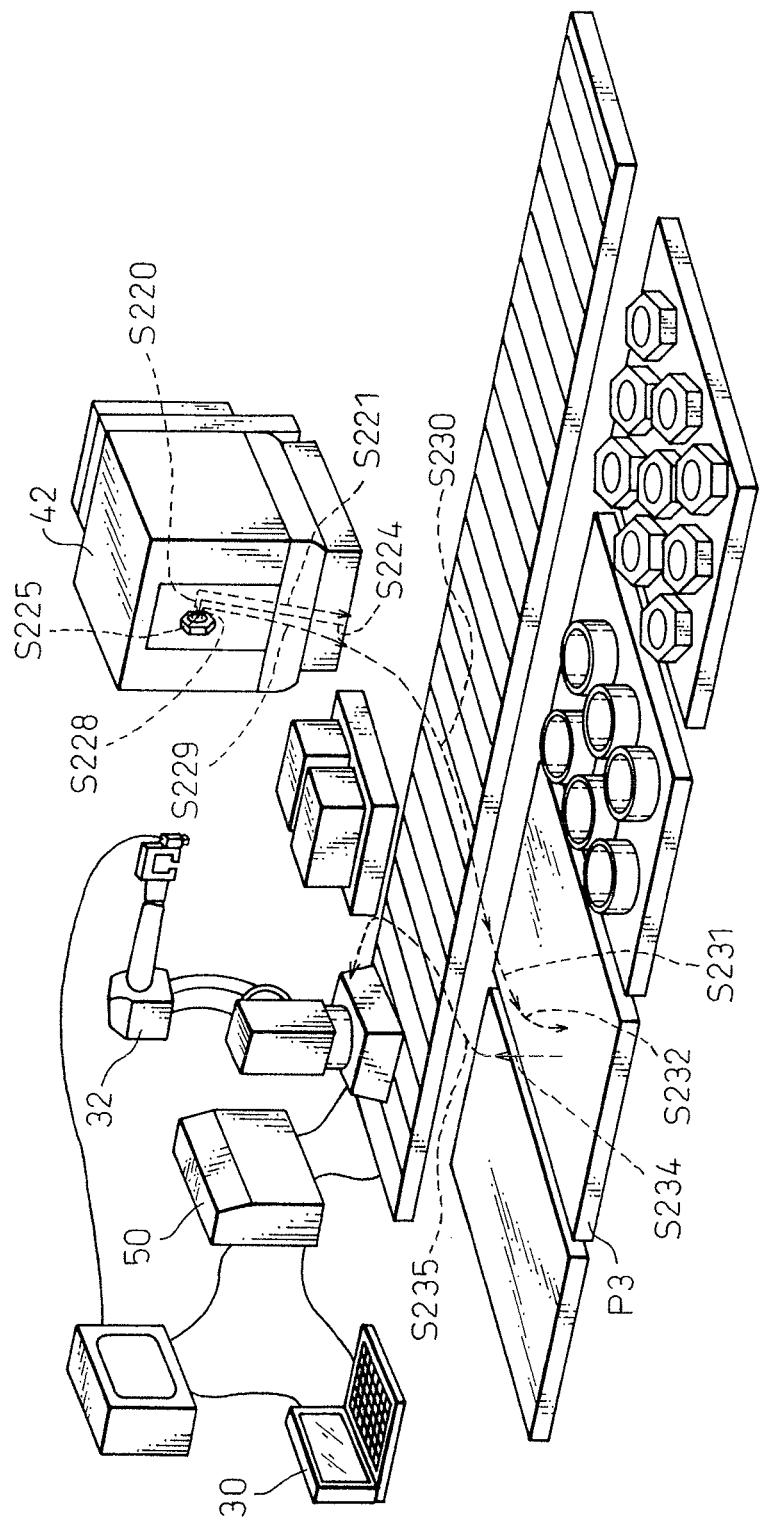
FIG. 14 is a schematic view showing, by a broken line with an arrow, a procedure of an operation executed by a robot in the manufacturing system of FIG. 5.

FIGS. 12 to 14 depict operation trajectories of the tool 34, which correspond to the above-described steps S200 to S235. In the illustrated operation trajectories, only the motions relating to steps S203 and S232 are arranged as the workpiece-type depending motion, and the remaining operations depicted by the other operation trajectories do not depend on the types of workpieces. For example, in a case where the workpiece W2 is placed on the pallet P1, a robot operation procedure in the first working route Ra substantially corresponds to the above-described procedure, except for the motions relating to steps S203 and S232.

Regarding the operation represented by the above steps S200 to S235, a single operation program 80 involving all steps may be prepared, but in this case, an extra-large program having a large number of steps is prepared. Considering the maintenance of the operation program, it is preferred that several operation programs be prepared respectively for several units of works (or work units) defined by dividing a series of works of the robot 32 into several groups on the basis of the similarity of motions. Now, a method of preparing an operation program and a method of correcting a taught point, using the operation program preparing device 30, for making the robot 32 execute the above-described handling operation are explained below. In this connection, the operation program preparing device (or the taught point correcting device) 30 is provided with a CPU (not shown) having the functions of the judging section 12, the data correcting section 14, the second judging section 18, the data recovering section 20 and the third judging section 22 in the taught point correcting device 10 shown in FIGS. 1A to 4B. Also, the hard disk device 94 constitutes the storing section 16 in the taught point correcting device 10 shown in FIGS. 1A to 4B.

In the above-described handling operation, operation programs are prepared respectively for work units, each relating to the workpiece holding or releasing motion of the robot 32. More specifically, the several groups of predetermined steps, i.e., steps S200 to S205, steps S206 to S211, steps S212 to S215, steps S216 to S221, steps S222 to S223, steps S224 to S229, and steps S230 to S235, are defined respectively as work units, and the operation program preparing device 30 prepares operation programs 801, 802, 803, 804, 805, 806, 807 corresponding individually to the above work units.

The operation program preparing device 30 prepares the operation programs 801, 802, 803, 804, 805, 806, 807, using the operation program definition data 96a concerning the working route Ra, as well as the working point definition data 981 concerning the workpiece W1 (both of which are stored in the hard disk device 94). The operation program definition data 96a describes operation modes of the robot 32 (such as style, speed, target position, object, etc. of a motion), and are prepared respectively for the seven operation programs 801 to 807 (i.e., an operator inputs these operation program definition data 96a). For example, the operation program definition data 96a for preparing the operation programs 802 and 803 are described by using the following variables:

%Fixture1.FrontPos%
%Fixture1.AbovePos%
%Fixture1.ApproachPos%
%Fixture1.GripPos%
%Fixture1.ReleasePos%
%Fixture1.Retrievepos%
%Robot1.Hand.Open%
%Robot1.Hand.OpenDone%
%Robot1.Hand.Close%
%Robot1.Hand.CloseDone%

Among these variables, the variables including "Fixture1" are associated with the positioning jig 38a, and the variables including "Robot1.Hand" are associated with the tool 34 of the robot 32. The variables associated with the positioning jig 38a correspond to the position data of a plurality of taught points included in the operation programs 802, 803, and are named "FrontPos", "AbovePos", "ApproachPos", "GripPos", "ReleasePos", "RetrievePos", respectively. The variables associated with the tool 34 correspond to the control signals for the tool 34, and are named "Open", "OpenDone", "Close", "CloseDone", respectively.

The working point definition data 981 describes the taught point position data and the tool control signal, which should be substituted for the above variables, and are also prepared respectively for the seven operation programs 801 to 807 (i.e., an operator inputs these working point definition data 981). In this connection, among the above seven operation programs, the operation program 801 describes position data concerning the pallet P1; the operation programs 802 and 803 describe position data concerning the positioning jig 38a; the operation programs 804 to 806 describe position data concerning the chuck of the processing machine 42; and the operation program 807 describes position data concerning the pallet P3. Each of these position data shows a spatial position of the taught point, and includes X, Y, Z-values representing a position and W (yaw), P (pitch), R (roll)-values representing an orientation, in a single, reference orthogonal coordinate system in the manufacturing system (each of these position data is referred to as "orthogonal format" data, in the present application). It will be understood that the above-described position data may also be described by operating angles of respective control axes of the robot 32 (each of these position data is referred to as "axis format" data, in the present application).

The operation program preparing device 30 prepares the operation programs 802 and 803 as follows, by using the above-described operation program definition data 96a and working point definition data 981:

Operation Program 802
1: J P [1:FrontPos] 100% CONT 100
2: J P [2:AbovePos] 100% CONT 100
3: L P [3:ApproachPos] 1000 mm/sec FINE
4: L P [4:ReleasePos] 200 mm/sec FINE
5: RDO[10]=On
6: WAIT RDI[10]=On
7: L P [5:RetrievePos] 400 mm/sec FINE
   P [1:FrontPos] {X=1688.40 mm, Y=30.30 mm, Z=1331.45 mm, W=64.62 deg, P=−85.60 deg, R=116.35 deg};
   P [2:AbovePos] {X=1679.51 mm, Y=−17.91 mm, Z=1716.07 mm, W=29.18 deg, P=−88.69 deg, R=150.21 deg};
   P [3:ApproachPos] {X=1679.51 mm, Y=−17.91 mm, Z=1416.07 mm, W=29.18 deg, P=−88.69 deg, R=150.21 deg};
   P [4:ReleasePos] {X=1674.51 mm, Y=−12.91 mm, Z=1316.07 mm, W=29.18 deg, P=−88.69 deg, R=150.21 deg};
   P [5:RetrievePos] {X=1679.51 mm, Y=−17.91 mm, Z=1416.07 mm, W=29.18 deg, P=−88.69 deg, R=150.21 deg};

Operation Program 803
1: J P [1:FrontPos] 100% CONT 100
2: J P [2:AbovePos] 100% CONT 100
3: RDO[10]=On
4: WAIT RDI[10]=On
5: L P [3:ApproachPos] 1000 mm/sec FINE
6: L P [4:GripPos] 200 mm/sec FINE
7: RDO[11]=On
8: WAIT RDI[11]=On
9: L P [5:RetrievePos] 400 mm/sec FINE
   P [1:FrontPos] {X=1688.40 mm, Y=30.30 mm, Z=1331.45 mm, W=64.62 deg, P=−85.60 deg, R=116.35 deg};
   P [2:AbovePos] {X=1679.51 mm, Y=−17.91 mm, Z=1716.07 mm, W=29.18 deg, P=−88.69 deg, R=150.21 deg};
   P [3:ApproachPos] {X=1679.51 mm, Y=−17.91 mm, Z=1416.07 mm, W=29.18 deg, P=−88.69 deg, R=150.21 deg};
   P [4:GripPos] {X=1679.51 mm, Y=−17.91 mm, Z=1316.07 mm, W=29.18 deg, P=−88.69 deg, R=150.21 deg};
   P [5:RetrievePos] {X=1679.51 mm, Y=−17.91 mm, Z=1416.07 mm, W=29.18 deg, P=−88.69 deg, R=150.21 deg};

As explained above, the taught points "FrontPos", "AbovePos", "ApproachPos", "RetrievePos" are used in both of the operation programs 802, 803. On the other hand, the taught point "ReleasePos" is used in only the operation program 802, and the taught point "GripPos" is used in only the operation program 803, each of which is described as P [4] in each operation program.

The position data of ReleasePos (i.e., a releasing position) includes X=1674.51 and Y=−12.91, while the position data of GripPos (i.e., a holding position) includes X=1679.51 and Y=−17.91; which shows a difference of 5 mm in each of X and Y-values between these taught points. This means that when the tool 34 holds or grips the workpiece W1 at step S204 in the operation program 801, a deviation of 5 mm of the holding position has occurred in each of X and Y-directions. In other words, although ReleasePos and GripPos should originally represent the same positions, in order to compensate for deviation occurring in the holding position (which may be, e.g., visually measured by an operator), the position data of ReleasePos is taught by intentionally shifting it by 5 mm from GripPos for each of X and Y-values, at the releasing position at step S208 in the subsequent operation program 802. As a result, at step S208, the workpiece W1 is released at the same position as GripPos.

Furthermore, regarding the position data of AbovePos, ApproachPos, GripPos, RetrievePos; there is a difference of 300 mm in Z-value between AbovePos and ApproachPos; there is a difference of 100 mm in Z-value between Approach-Pos and GripPos; and all values are identical between ApproachPos and RetrievePos. As explained above, there is a specified relative positional relationship (i.e., a taught-point rule) corresponding to the robot operation, between the above-described taught points.

For example, the taught-point rule 102 concerning the above-described position data is defined as follows:

```
<OBJECT class="FIXTURE" name="Fixture1">
 <RULES>
  <RULE relation="EQ" sub="ReleasePos.X"
  main="GripPos.X" unit="mm">5</RULE>
  <RULE relation="EQ" sub="ReleasePos.Y"
  main="GripPos.Y" unit="mm">-5</RULE>
  <RULE relation="EQ" sub="AbovePos.Z"
  main="ApproachPos.Z" unit="mm">-300</RULE>
  <RULE relation="EQ" sub="ApproachPos.Z"
  main="GripPos.Z" unit="mm">-100</RULE>
  <RULE relation="EQ" sub="RetrievePos.X"
  main="ApproachPos.X">0</RULE>
  <RULE relation="EQ" sub="RetrievePos.Y"
  main="ApproachPos.Y">0</RULE>
  <RULE relation="EQ" sub="RetrievePos.Z"
  main="ApproachPos.Z">0</RULE>
  <RULE relation="EQ" sub="RetrievePos.W"
  main="ApproachPos.W">0</RULE>
  <RULE relation="EQ" sub="RetrievePos.P"
  main="ApproachPos.P">0</RULE>
  <RULE relation="EQ" sub="RetrievePos.R"
  main="ApproachPos.R">0</RULE>
  <RANGE relation="GT" value="GripPos.Z"
  unit="mm">1000</RANGE>
  <RANGE relation="LT" value="GripPos.Z"
  unit="mm">1350</RANGE>
  <RANGE2 relation="GT" value1="GripPos.Z"
  value2="ApproachPos.Z" unit="mm">100</RANGE2>
  <RANGE2 relation="LT" value1="GripPos.Z"
  value2="ApproachPos.Z" unit="mm">500</RANGE2>
 </RULES>
```

Among the above series of taught-point rules, <RULE> defines a comparison result and a difference value (or a distance) between two variables (i.e., the position data of taught points). For example, <RULE relation="EQ" sub="a" main="b" unit="mm">c</RULE> defines that there is a relationship of b-a=c, and that a unit of the difference is mm. In the item of relation=, which represents a relationship, any one of EQ, GE, GT, LE, LT, NE can be assigned, which mean b-a=c, b-a≥c, b-a>c, b-a≤c, b-a<c, b-a< >c (i.e., b-a is different from c).

If <RULE> is not satisfied, the value of an argument expressed by sub=is corrected to satisfy <RULE>, while referring to the value of an argument expressed by main=as the basis. For example, if the taught-point rule of <RULE relation="EQ" sub="ReleasePos.X" main="GripPos.X" unit="mm">5</RULE> (which means GripPos.X−Releas-Pos.X=5) is not satisfied, ReleasePos.X, is corrected, and GripPos.X is not corrected. According to the above way of definition, it is possible to prescribe a relative importance between the corrections of two taught points. In other words, when a taught point with a higher importance of correction is described in main=and a taught point with a lower importance of correction is described in sub=, it is possible to prevent the correction of higher importance from being performed while accompanying the correction of lower importance.

The <RULE>s are processed in the order of definition (i.e., in the order of description). In the above example, in accordance with the first taught-point rule (GripPos.X-Release-Pos.X=5), the value of ReleasePos.X must be GripPos.X−5 and, if not, ReleasePos.X is corrected. Next, in accordance with the second taught-point rule (GripPos.Y−Release-Pos.Y=−5), the value of ReleasePos.Y must be GripPos.Y+5 and, if not, ReleasePos.Y is corrected. Thereafter, it is sequentially checked whether the taught-point rule is satisfied or not, in the order of description. According to the above way of definition, it is possible to correct the position data in designated order, like a chain reaction, for all of the taught points having directly or indirectly a predetermined relative positional relationship. In the above example, GripPos.X corresponds to the "position data of the first taught point" as described.

Among the above series of taught-point rules, <RANGE> defines an allowable range of one variable (i.e., the position data of a taught point). For example, in the above exemplary description, it is prescribed that the value of GripPos.Z must be larger than 1000 mm and smaller than 1350 mm. This taught-point rule <RANGE> has a higher priority than the above taught-point rule <RULE>, regardless of the description order. For example, it is estimated that the corrected value of GripPos.Z, corrected in accordance with <RULE>, will become at most 1000 mm or at least 1350 mm, the correction is not performed, in accordance with the rule of <RANGE>, and the value of GripPos.Z before the correction is maintained.

Among the above series of taught-point rules, <RANGE2> defines an allowable range of a difference (or a distance) between two variables (i.e., the position data of taught points). For example, in the above exemplary description, it is prescribed that the difference between the value of GripPos.Z and the value of ApproachPos.Z must be larger than 100 mm and smaller than 500 mm. In other words, the position at which the robot 32 starts approaching the workpiece W1 must be spaced at a distance larger than 100 mm and smaller than 500 mm from the holding position on the workpiece W1 by the tool 34. This taught-point rule <RANGE2> also has a higher priority than the taught-point rule <RULE>. For example, it is estimated that the difference between Grip-Pos.Z, the value of which is corrected in accordance with <RULE>, and ApproachPos.Z will become at most 100 mm or at least 500 mm, the correction is not performed, in accordance with the rule of <RANGE2>, and the value of Grip-Pos.Z before the correction is maintained.

Referring again to FIG. 6, the operation program preparing device 30 reads, through the network interface 70, program names, taught point names, line numbers and position data, described in the operation programs 801, 802, 803, 804, 805, 806, 807 (FIG. 7) stored in the memory 68 of the control device 50, based on the control program 78 (FIG. 7). The operation program preparing device 30 then prepares the taught point database 104 (FIG. 8) to be stored in the hard disk device 94, based on the read information (hereinafter referred to as taught point data). For example, the taught point database 104 concerning the operation programs 802 and 803 is prepared as shown by the following table:

[Taught Point Database]

| Data Number | Record Link | Operation Program Name | Line Number | Position Name | Coordinate Number | Tool Number | Position Format | Position Data X | Y | Z | W | P | R |
|---|---|---|---|---|---|---|---|---|---|---|---|---|---|
| 1 | 0 | PRG802 | 1 | FrontPos | 0 | 0 | 1 | 1688.40 | 30.30 | 1331.45 | 64.62 | −85.60 | 116.35 |
| 2 | 0 | PRG802 | 2 | AbovePos | 0 | 0 | 1 | 1679.51 | −17.91 | 1716.07 | 29.18 | −88.69 | 150.21 |
| 3 | 0 | PRG802 | 3 | ApproachPos | 0 | 0 | 1 | 1679.51 | −17.91 | 1416.07 | 29.18 | −88.69 | 150.21 |
| 4 | 0 | PRG802 | 4 | ReleasePos | 0 | 0 | 1 | 1674.51 | −12.91 | 1316.07 | 29.18 | −88.69 | 150.21 |
| 5 | 0 | PRG802 | 7 | RetrievePos | 0 | 0 | 1 | 1679.51 | −17.91 | 1416.07 | 29.18 | −88.69 | 150.21 |
| 6 | 0 | PRG803 | 1 | FrontPos | 0 | 0 | 1 | 1688.40 | 30.30 | 1331.45 | 64.62 | −85.60 | 116.35 |
| 7 | 0 | PRG803 | 2 | AbovePos | 0 | 0 | 1 | 1679.51 | −17.91 | 1716.07 | 29.18 | −88.69 | 150.21 |
| 8 | 0 | PRG803 | 5 | ApproachPos | 0 | 0 | 1 | 1679.51 | −17.91 | 1416.07 | 29.18 | −88.69 | 150.21 |
| 9 | 0 | PRG803 | 6 | GripPos | 0 | 0 | 1 | 1679.51 | −17.91 | 1316.07 | 29.18 | −88.69 | 150.21 |
| 10 | 0 | PRG803 | 9 | RetrievePos | 0 | 0 | 1 | 1679.51 | −17.91 | 1416.07 | 29.18 | −88.69 | 150.21 |

In the above taught point database 104, one taught point includes a data number, a record link, an operation program name, a line number, a position name, a coordinate number, a tool number, a position format and position data values. In the above example, the operation program name "PRG802" denotes the operation program 802, and "PRG803" denotes the operation program 803. The line number indicates the description order of the taught point in the operation program. In a case where the identical taught point is used a plurality of times in a single operation program, a plurality of such taught point data are listed in the database 104, in which only line numbers are different from each other. The coordinate number specifies a coordinate system as the basis of the position data of a taught point. The tool number indicates the type of the tool 34 attached to the robot. If different types of tools are used for the same taught point, the position data are usually different. The position format indicates whether the format of position data is an axis format or an orthogonal format, and in the above example, the position format is the orthogonal format. The position data includes the X, Y, Z, W, P, R-values, as described above.

The position name is the name of the above-described taught point. The identical position name denotes an identical taught point, and the different position name denotes a different taught point. The taught points having an identical position name are recognized as an identical taught point, even when any one of the operation program name, the line number, the coordinate number, the tool number, the position format and the position data value shows a different state. For example, the taught points identical to each other may be expressed by using different coordinate systems. Also, the taught points identical to each other may be expressed by using the operating angles of respective control axes of the robot in states where the different tools are attached.

The data number denotes a describing location (or line) of the taught point data in the database 104. Each time when new taught point data is added to the database 104, a new data number is appended to the added taught point data, in ascending order. The record link shows the record of an update of the taught point data in the database 104. When the taught point data is updated by the correction of the position data, the taught point data before update is not erased, and the updated taught point data, to which a new data number is appended, is additionally described in the database 104. In this connection, the data number of the updated taught point data is written in the record link of the taught point data before update, and 0 (which means the latest data) is written in the record link of the updated taught point data. As a result, the several taught point data of one taught point, given by an initial setting and several update settings, are fully recorded while clarifying a correlation therebetween.

In the above configuration, the operation program preparing device 30 always compares the position data of the respective taught points of the operation program, actually making the robot 32 operate, with the corresponding taught point data stored in the taught point database 104, through the network interface 70 based on the control program 78. When it is detected that the position data of at least one taught point of the operation program does not coincide with the corresponding taught point data in the taught point database 104, the operation program preparing device 30 starts the automatic correction of the taught point, in accordance with the taught-point rule 102. in this connection, the taught point database 104 before the correction is copied and stored as a preserved taught point database 106 (FIG. 8). The preserved taught point database 106 is used when it is necessary to cancel the automatic correction of the taught point.

For example, assume that, in the middle of the operation, an operator makes the robot 32 operate in a manual mode by using the operating panel 92, so as to correct the position of GripPos in the operation program 803, among initially given taught points, as follows:

Position data of GripPos:

X=1670.51 mm, Y=−27.91 mm, Z=1016.07 mm, W=29.18 deg, P=−88.69 deg, R=150.21 deg In this case, the validity of correction of the position data of GripPos is first verified, in accordance with the taught-point rules <RANGE> and <RANGE2>. The Z-value after the correction is larger than 1000 mm and smaller than 1350 mm, and therefore satisfies <RANGE>. Also, the difference between the Z-value after the correction and ApproachPos.Z is 400 mm, and therefore satisfies <RANGE2> too.

Next, it is verified whether the corrected GripPos satisfies a prescribed relative positional relationship, in the description order of the taught-point rule <RULE>. First, the position data of ReleasePos is corrected, in accordance with the first and second <RULE>s, as follows:

Position data of ReleasePos:

X=1665.51 mm, Y=−22.91 mm, Z=1316.07 mm, W=29.18 deg, P=−88.69 deg, R=150.21 deg Next, in accordance with the fourth <RULE>, the position data of ApproachPos is corrected as follows:

Position data of ApproachPos:

X=1679.51 mm, Y=−17.91 mm, Z=1116.07 mm, Z=29.18 deg, P=−88.69 deg, R=150.21 deg Next, in accordance with the fifth to tenth <RULE>s, the position data of RetrievePos is corrected as follows:
Position data of RetrievePos:
X=1679.51 mm, Y=−17.91 mm, Z=1116.07 mm, Z=29.18 deg, P=−88.69 deg, R=150.21 deg Based on the above corrections, the taught point data of the data numbers 3, 4, 5, 8, 9, 10 are updated, in the taught point database 104. The updated taught point database 104 is shown by the following table:

[Taught Point Database (Updated)]

| Data Number | Record Link | Operation Program Name | Line Number | Position Name | Coordinate Number | Tool Number | Position Format | Position Data X | Y | Z | W | P | R |
|---|---|---|---|---|---|---|---|---|---|---|---|---|---|
| 1 | 0 | PRG802 | 1 | FrontPos | 0 | 0 | 1 | 1688.40 | 30.30 | 1331.45 | 64.62 | −85.60 | 116.35 |
| 2 | 0 | PRG802 | 2 | AbovePos | 0 | 0 | 1 | 1679.51 | −17.91 | 1716.07 | 29.18 | −88.69 | 150.21 |
| 3 | 13 | PRG802 | 3 | ApproachPos | 0 | 0 | 1 | 1679.51 | −17.91 | 1416.07 | 29.18 | −88.69 | 150.21 |
| 4 | 12 | PRG802 | 4 | ReleasePos | 0 | 0 | 1 | 1674.51 | −12.91 | 1316.07 | 29.18 | −88.69 | 150.21 |
| 5 | 15 | PRG802 | 7 | RetrievePos | 0 | 0 | 1 | 1679.51 | −17.91 | 1416.07 | 29.18 | −88.69 | 150.21 |
| 6 | 0 | PRG803 | 1 | FrontPos | 0 | 0 | 1 | 1688.40 | 30.30 | 1331.45 | 64.62 | −85.60 | 116.35 |
| 7 | 0 | PRG803 | 2 | AbovePos | 0 | 0 | 1 | 1679.51 | −17.91 | 1716.07 | 29.18 | −88.69 | 150.21 |
| 8 | 14 | PRG803 | 5 | ApproachPos | 0 | 0 | 1 | 1679.51 | −17.91 | 1416.07 | 29.18 | −88.69 | 150.21 |
| 9 | 11 | PRG803 | 6 | GripPos | 0 | 0 | 1 | 1679.51 | −17.91 | 1316.07 | 29.18 | −88.69 | 150.21 |
| 10 | 16 | PRG803 | 9 | RetrievePos | 0 | 0 | 1 | 1679.51 | −17.91 | 1416.07 | 29.18 | −88.69 | 150.21 |
| 11 | 0 | PRG803 | 6 | GripPos | 0 | 0 | 1 | 1670.51 | −27.91 | 1016.07 | 29.18 | −88.69 | 150.21 |
| 12 | 0 | PRG802 | 4 | ReleasePos | 0 | 0 | 1 | 1665.51 | −22.91 | 1316.07 | 29.18 | −88.69 | 150.21 |
| 13 | 0 | PRG802 | 3 | ApproachPos | 0 | 0 | 1 | 1679.51 | −17.91 | 1116.07 | 29.18 | −88.69 | 150.21 |
| 14 | 0 | PRG803 | 5 | ApproachPos | 0 | 0 | 1 | 1679.51 | −17.91 | 1116.07 | 29.18 | −88.69 | 150.21 |
| 15 | 0 | PRG802 | 7 | RetrievePos | 0 | 0 | 1 | 1679.51 | −17.91 | 1116.07 | 29.18 | −88.69 | 150.21 |
| 16 | 0 | PRG803 | 9 | RetrievePos | 0 | 0 | 1 | 1679.51 | −17.91 | 1116.07 | 29.18 | −88.69 | 150.21 |

As should be apparent from the above, the updated taught point data, to which new data numbers 11 to 16 are appended, are recorded in the database 104, and the data numbers of the updated taught point data are written in the record link column of the corresponding, taught point data before the update. In the database 104, it is understood that the taught point data involving the record link other than 0 are the past or old data, and the taught point data involving the record link 0 are valid at the present time.

When the corrections of position data of the taught points based on <RULE> have been completed, the validity of the corrections is verified again, in accordance with <RANGE> and <RANGE2>. In the above example, both of <RANGE> and <RANGE2> are satisfied even after the correction. Then, in order to make the taught point data coincide with the contents of the updated taught point database 104, the operation program preparing device 30 issues a taught-point correction command to the control program 78 in the memory 68 through the network interface 70 of the control device 50, whereby correcting the position data of ApproachPos on the third line, ReleasePos on the fourth line and RetrievePos on the seventh line of the operation program 802, as well as ApproachPos on the fifth line and RetrievePos on the ninth line of the operation program 803, respectively. Further, the operation program preparing device 30 confirms, through the network interface 70, whether the position data of all taught points included in all operation programs in the memory 68 coincide with the corresponding taught point data in the updated taught point database 104, and issues a taught point correction command to the control program 78 regarding a taught point not having coincidence. The control device 50 displays the operation program names of and position names of the corrected taught points on the display 92a of the operating panel 92, based on the control program 78.

At an instant the corrections of position data of the taught points based on <RULE> have been completed, if there is a correction result which does not satisfy either <RANGE> or <RANGE2>, all of the corrections are cancelled. More specifically, the taught point database 104 is rewritten to restore the content before the correction, using the preserved taught point database 106. Further, in order to make the taught point data coincide with the contents of the rewritten taught point database 104, the operation program preparing device 30 issues a taught-point correction command to the control program 78 in the memory 68 through the network interface 70 of the control device 50, whereby rewriting the position data of GripPos in the operation program 803 to restore the value before the correction. The control device 50 displays on the operating panel 92 that the GripPos in the operation program 803 has been rewritten, based on the control program 78. The preserved taught point database 106 that has become unnecessary due to the rewriting of the data is erased from the hard disk device 94.

In a case where an operator has performed the above correcting work for the taught points several times, the hard disk device 94 stores the taught point databases 104 before the respective updates, obtained each time when the taught point database 104 is updated, as a plurality of preserved taught point databases 106. The operator can operate the operating panel 92 to select a desired preserved taught point database 106, considered to be most appropriate, from among the several preserved taught point databases 106, and can rewrite the currently valid taught point database 104 by using the selected preserved taught point database 106. As a result, it is possible to cancel the correction of position data of the taught points by the operator and the automatic correction of position data of the correlative taught point accompanying the same, and thus to recover the taught point data at an optional time.

The taught point data of both of the taught point database 104 and the preserved taught point database 106 are restricted by the taught-point rule 102 at all times. Also, upon referring to the record links of both of the taught point database 104 and the preserved taught point database 106, the history or background of the corrections of the position data of the respective taught points becomes immediately clear. Therefore, when the record of update is displayed on the display 92a of the operating panel 92, the operator can grasp which correction has been made at which time for a desired taught point. Furthermore, in order to cancel the taught point correction at a desired time, the operator can select a taught point database just before the taught point correction to be cancelled, from among the several preserved taught point databases 106, and rewrite the currently valid taught point database 104 by using the selected taught point database 106, and thereby recover a required taught point database.

When the correction of one taught point is canceled, the position data of all of the associated taught points are restored to the values before the correction. Even when any correction of any taught point at any time is canceled, all taught points always satisfy the taught-point rule 102, and therefore the subsequent operations ensure safety.

If the taught-point correcting work is performed for many hours, the large number of preserved taught point databases 106 will be stored, and the respective taught point databases 104, 106, storing a large amount of past or old taught point data, will be enlarged. In this context, the operation program preparing device 30 is advantageously configured so as to be able to erase some or all of the preserved taught point databases 106 stored in the hard disk device 94. In this connection, the operator can instruct the control program 78 by using the operating panel 92 to erase the past or old taught point data included in the erased taught point database 106, from the remaining taught point databases 104 and 106. Moreover, when the taught-point rule 102 is revised, the operator can instruct the control program 78 by using the operating panel 92 to erase all of the taught point databases 104 and 106 from the hard disk device 94, and to prepare again a taught point database 104 based on the contents of all operation programs in the memory 68.

While preferred embodiments of the present invention have been explained above, it is also possible to define the present invention in the other categories, from a viewpoint that the operation program preparing device (or the taught point correcting device) 30 can be configured by a personal computer, as follows:

The present invention provides a taught point correcting program used for correcting a taught point in the operation programs 80, 82 of a robot 32, the program making a computer 30 function as a judging section 12 judging whether position data of any of a plurality of different taught points, previously taught and included in the operation programs 80, 82, has been corrected or not; and a data correcting section 14 correcting, when the judging section judges that position data of a first taught point among the different taught points has been corrected, position data of a correlative taught point having a predetermined relative positional relationship with the first taught point, in accordance with a taught-point rule 102 previously prescribing the relative positional relationship between the different taught points.

The present invention also provides a computer-readable recording medium used for correcting a taught point in the operation programs 80, 82 of a robot 32, the recording medium recording a taught point correcting program for making a computer 30 function as a judging section 12 judging whether position data of any of a plurality of different taught points, previously taught and included in the operation programs 80, 82, has been corrected or not; and a data correcting section 14 correcting, when the judging section judges that position data of a first taught point among the different taught points has been corrected, position data of a correlative taught point having a predetermined relative positional relationship with the first taught point, in accordance with a taught-point rule 102 previously prescribing the relative positional relationship between the different taught points.

The invention further provides a taught point correcting method for correcting a taught point in the operation programs 80, 82 of a robot 32 by using a computer 30, the method comprising the steps of judging, by a judging section 12 of the computer 30, whether position data of any of a plurality of different taught points, previously taught and included in the operation programs 80, 82, has been corrected or not; and correcting, by a data correcting section 14 of the computer 30, when the judging section 12 judges that position data of a first taught point among the different taught points has been corrected, position data of a correlative taught point having a predetermined relative positional relationship with the first taught point, in accordance with a taught-point rule 102 previously prescribing the relative positional relationship between the different taught points.

While the invention has been described with reference to specific preferred embodiments, it will be understood by those skilled in the art that various changes and modifications may be made thereto without departing from the scope of the following claims.

The invention claimed is:

1. A taught point correcting device for correcting a taught point in an operation program of a robot, said device comprising:
   a first judging section judging whether position data of any of a plurality of different taught points, previously taught and included in an operation program, has been corrected or not; and
   a data correcting section correcting, when said first judging section judges that position data of a first taught point among said plurality of different taught points has been corrected, position data of a correlative taught point defined to have a relative positional relationship with said first taught point so as to satisfy said relative positional relationship, in accordance with a command describing a taught-point rule previously prescribing, by a robot language, a specified relative positional relationship and names of at least one set of taught points having said specified relative positional relationship in connection with said plurality of different taught points,
   wherein said taught-point rule comprises:
   a) a first taught-point rule defining a distance between two taught points; and
   b) at least one of a second taught-point rule defining an allowable range of a position of one taught point and a third taught-point rule defining an allowable range of a distance between two taught points,
   wherein, when corrections of position data of said plurality of different taught points based on the first taught-point rule have been completed, a validity of said corrections is verified in accordance with at least one of said second taught-point rule and said third taught-point rule.

2. A taught point correcting device as set forth in claim 1, wherein said operation program includes three or more different taught points; and wherein said data correcting section corrects position data of all of correlative taught points having directly and indirectly said relative positional relationship with said first taught point.

3. A taught point correcting device as set forth in claim 1, wherein said first judging section judges whether position data of any of a plurality of different taught points, previously taught and included in a plurality of operation programs, has been corrected or not; and wherein said data correcting section corrects position data of all of correlative taught points, each of which is said correlative taught point, in said plurality of operation programs, in accordance with said command describing said taught-point rule.

4. A taught point correcting device as set forth in claim 3, wherein said data correcting section uses a taught point database describing, in a correlative manner, a name of each of said operation programs, a name of each of said different taught points and position data of each of said different taught points, and updates an operation program including said correlative taught point, among said operation programs described in said taught point database, by a correction of said correlative taught point.

5. A taught point correcting device as set forth in claim 1, further comprising a third judging section judging, when said first judging section judges that said position data of said first taught point has been corrected, which one of a correction of said position data of said first taught point and a correction of said position data of said correlative taught point is more important, in accordance with said command describing said taught-point rule; wherein said data correcting section corrects said position data of said correlative taught point when said third judging section judges that said correction of said position data of said first taught point is more important than said correction of said position data of said correlative taught point.

6. A taught point correcting device as set forth in claim 5, further comprising a storing section storing said taught-point rule; wherein said taught-point rule includes a fourth taught-point rule prescribing a relative importance between at least two taught points among said plurality of different taught points.

7. A computer-readable recording medium used for correcting a taught point in an operation program of a robot, said computer-readable recording medium having embodied thereon a taught point correcting program for making a computer function as:
  i) a judging section judging whether position data of any of a plurality of different taught points, previously taught and included in an operation program, has been corrected or not; and
  ii) a data correcting section correcting, when said judging section judges that position data of a first taught point among said plurality of different taught points has been corrected, position data of a correlative taught point defined to have a relative positional relationship with said first taught point so as to satisfy said relative positional relationship, in accordance with a command describing a taught-point rule previously prescribing, by a robot language, a specified relative positional relationship and names of at least one set of taught points having said specified relative positional relationship in connection with said plurality of different taught points, wherein said taught-point rule comprises:
  a) a first taught-point rule defining a distance between two taught points; and
  b) at least one of a second taught-point rule defining an allowable range of a position of one taught point and a third taught-point rule defining an allowable range of a distance between two taught points,
wherein, when corrections of position data of said plurality of different taught points based on the first taught-point rule have been completed, a validity of said corrections is verified in accordance with at least one of said second taught-point rule and said third taught-point rule.

8. A taught point correcting method for correcting a taught point in an operation program of a robot by using a computer, said method comprising:
  judging, by a judging section of a computer, whether position data of any of a plurality of different taught points, previously taught and included in an operation program, has been corrected or not; and
  correcting, by a data correcting section of a computer, when said judging section judges that position data of a first taught point among said plurality of different taught points has been corrected, position data of a correlative taught point defined to have a relative positional relationship with said first taught point so as to satisfy said relative positional relationship, in accordance with a command describing a taught-point rule previously prescribing, by a robot language, a specified relative positional relationship and names of at least one set of taught points having said specified relative positional relationship in connection with said plurality of different taught points,
wherein said taught-point rule comprises:
  a) a first taught-point rule defining a distance between two taught points; and
  b) at least one of a second taught-point rule defining an allowable range of a position of one taught point and a third taught-point rule defining an allowable range of a distance between two taught points,
wherein, when corrections of position data of said plurality of different taught points based on the first taught-point rule have been completed, a validity of said corrections is verified in accordance with at least one of said second taught-point rule and said third taught-point rule.

* * * * *